(12) United States Patent
Ross

(10) Patent No.: US 10,375,583 B2
(45) Date of Patent: *Aug. 6, 2019

(54) UAV NETWORK DESIGN

(71) Applicant: Vivint, Inc., Provo, UT (US)

(72) Inventor: Kevin Ross, Lehi, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,260

(22) Filed: Apr. 19, 2018

(65) Prior Publication Data

US 2018/0310187 A1    Oct. 25, 2018

Related U.S. Application Data

(63) Continuation of application No. 14/866,277, filed on Sep. 25, 2015, now Pat. No. 9,973,939.

(51) Int. Cl.
| | | |
|---|---|---|
| *G06K 9/00* | (2006.01) | |
| *B64C 39/02* | (2006.01) | |
| *H04W 16/18* | (2009.01) | |
| *H04B 7/185* | (2006.01) | |

(52) U.S. Cl.
CPC .......... *H04W 16/18* (2013.01); *B64C 39/024* (2013.01); *G06K 9/0063* (2013.01); *G06K 9/00637* (2013.01); *B64C 2201/123* (2013.01); *H04B 7/18504* (2013.01)

(58) Field of Classification Search
None
See application file for complete search history.

(56) References Cited

U.S. PATENT DOCUMENTS

| | | | |
|---|---|---|---|
| 2,784,403 | A | 3/1957 | Marsh et al. |
| 3,218,913 | A | 11/1965 | Kaestner |
| 3,240,927 | A | 3/1966 | Fite et al. |
| 4,555,646 | A | 11/1985 | Miram et al. |
| 6,330,459 | B1 | 12/2001 | Crichton et al. |
| 6,847,826 | B1 | 1/2005 | Wesby et al. |
| 7,228,123 | B2 | 6/2007 | Moursund et al. |
| 8,654,672 | B1 * | 2/2014 | Nicholas ............ H04W 40/246 370/254 |

(Continued)

FOREIGN PATENT DOCUMENTS

WO    2007094765 A2    8/2007

OTHER PUBLICATIONS

PCT International Search Report for International Application No. PCT/US2016/049511, dated Dec. 13, 2016 (3 pp.).

*Primary Examiner* — Nancy Bitar
(74) *Attorney, Agent, or Firm* — Holland & Hart LLP

(57) ABSTRACT

Methods, apparatuses, and systems relating to drone-assisted mesh network design are disclosed. Exemplary methods for wireless networking and communications may include identifying a geographic area, receiving topographic data obtained by an unmanned air vehicle at a first predetermined height, the topographic data relating to the geographic area, analyzing the topographic data to identify one or more characteristics, determining a location relating to a first wireless network device based at least in part on the analyzing, and determining one or more locations each relating to one or more other wireless network devices within the geographic area based at least in part on the location relating to the first wireless network device.

19 Claims, 12 Drawing Sheets

(56) References Cited

U.S. PATENT DOCUMENTS

| | | | |
|---|---|---|---|
| 8,942,938 B2* | 1/2015 | Bishop | G01R 13/02 |
| | | | 702/67 |
| 9,973,939 B2* | 5/2018 | Ross | B64C 39/024 |
| 2003/0195017 A1* | 10/2003 | Chen | H01Q 1/246 |
| | | | 455/562.1 |
| 2004/0235484 A1* | 11/2004 | Korpela | H04W 24/02 |
| | | | 455/446 |
| 2005/0225725 A1 | 10/2005 | Warden et al. | |
| 2006/0199545 A1 | 9/2006 | Abusch-Magder et al. | |
| 2007/0088709 A1 | 4/2007 | Bailey et al. | |
| 2007/0225023 A1 | 9/2007 | Abusch-Magder | |
| 2009/0274130 A1 | 11/2009 | Boch | |
| 2010/0151865 A1 | 6/2010 | Camp, Jr. et al. | |
| 2011/0075601 A1 | 3/2011 | Zheng | |
| 2011/0075720 A1 | 3/2011 | Elenes | |
| 2013/0231132 A1* | 9/2013 | Huang | G01S 5/02 |
| | | | 455/456.1 |
| 2014/0316616 A1 | 10/2014 | Kugelmass | |
| 2015/0029176 A1 | 1/2015 | Baxter et al. | |
| 2015/0063202 A1 | 3/2015 | Mazzarella et al. | |
| 2015/0117708 A1 | 4/2015 | Guigues et al. | |
| 2016/0127920 A1 | 5/2016 | Thomas et al. | |
| 2016/0171340 A1 | 6/2016 | Fleishman et al. | |

\* cited by examiner

UAV NETWORK DESIGN

CROSS-REFERENCE TO RELATED APPLICATIONS

The present application is a continuation of U.S. patent application Ser. No. 14/866,277, filed Sep. 25, 2015, titled "UAV NETWORK DESIGN," now U.S. Pat. No. 9,973,939, and assigned to the assignee hereof, the disclosure of which is expressly incorporated herein in its entirety by this reference.

BACKGROUND

The present disclosure, for example, relates to security and/or automation systems, and more particularly to wireless network design using topographical data from an unmanned air vehicle, such as a drone.

Security, automation, and wireless communication systems are widely deployed to provide various types of communication and functional features such as monitoring, communication, notification, and/or others. These systems may be capable of supporting communication with a user through a communication connection or a system management action.

Wireless communication networks present distinct challenges, especially in actual deployment. Often theoretical wireless networks appear to sufficiently cover an entire area, but after installation or through testing, it is discovered that they do not. Moreover, different wave frequencies such as millimeter waves (e.g., 60 GHz), rely to varying degrees on the wireless connection between two APs. If objects (such as buildings, homes, or trees) interfere with the wireless connection (and the corresponding line of sight) then wireless transmissions may be severely limited, if they work at all.

Often practical wireless mesh network design and implementation require human-based, time-intensive and expensive procedures at the site itself to determine wireless network design features, position, placement, and/or orientation. These expensive and time intensive procedure make network design and deployment cost prohibitive. Moreover, current network design techniques are inaccurate and cumbersome. Thus, there exists a need for more effective systems and methods for constructing reliable wireless networks.

SUMMARY

The present systems and methods relate to wireless network design and implementation using unmanned air vehicles, including, but not limited to drones. The present systems and methods may facilitate wireless mesh network communications for millimeter wave applications, among others. These systems and methods relate to determining topographic data and characteristics of a geographic area using one or more unmanned air vehicles, among other tools. An unmanned air vehicle may collect data at a first height above a geographic area and corresponding structures and may also collect data at a second height different from the first height above the same or a different geographic position and/or area. Through analyzing the topographic data and/or other data, characteristics and locations relating to one or more wireless network devices such as APs, may be determined based at least in part on the actual and accurate unmanned air vehicle data.

The use of unmanned air vehicles advantageously does not require the stitching together of multiple types of data or inaccurate data capture based on satellite images and/or ground images. Moreover, the use of unmanned air vehicles for mesh network design increases accuracy and reveals problems, obstacles, and other challenges associated with actual network design and deployment lacking in actions based on other data, such as satellite images and/or ground images.

Methods for wireless networking and communications are disclosed. In some embodiments, methods may include identifying a geographic area, receiving topographic data obtained by an unmanned air vehicle at a first predetermined height, the topographic data relating to the geographic area, analyzing the topographic data to identify one or more characteristics, determining a location relating to a first wireless network device based at least in part on the analyzing, and/or determining one or more locations each relating to one or more other wireless network devices within the geographic area based at least in part on the location relating to the first wireless network device.

In some embodiments, methods may include receiving topographic data obtained by the unmanned air vehicle at a second predetermined height different from the first predetermined height. In some embodiments, the topographic data may include Lidar data, among others. In some embodiments, methods may include receiving image data and analyzing the image data and the topographic data to identify the one or more characteristics. In some embodiments, the topographic data may include image data obtained from one or more points within the geographic area.

In some embodiments, topographic data may include image data and distance data. In some embodiments, distance data may include one or more distances based at least in part on the location relating to the first wireless network device and a surface of one or more structures. In some embodiments, topographic data may include image data and direction data. In some embodiments, topographic data may include data describing a spatial relationship between two or more structures.

In some embodiments, topographic data may include data describing one or more characteristics of a wireless signal inhibitor. In some embodiments, determining the location relating to the first wireless network device may include comparing a potential location on a surface of one or more structures. In some embodiments, the one or more characteristics may include at least one of a color, a texture, an edge shape, an outline, an object classification, a material, a reflectivity, an orientation, a position, one or more relative heights, one or more relative distances, or a shape.

In some embodiments, analyzing the topographic data may include comparing topographic data obtained by the unmanned air vehicle at two or more positions. In some embodiments, the unmanned air vehicle may include a drone. In some embodiments, determining the one or more locations relating to the one or more other wireless network devices within the geographic area may include identifying one or more sight paths between the location relating to the first wireless network device and at least some of the one or more locations relating to the one or more other wireless network devices.

In some embodiments, methods may include displaying the one or more sight paths on a representation of the geographic area. In some embodiments, methods may include determining a mesh network design based at least in part on the determined location relating to a first wireless network device or the determined one or more locations each relating to one or more other wireless network devices.

Apparatuses for wireless networking and communications are disclosed. In some embodiments, apparatuses may include a processor, memory in electronic communication with the processor, and instructions stored in the memory. In some embodiments, the instructions may be executable by the processor to identify a geographic area, receive topographic data obtained by an unmanned air vehicle at a first predetermined height, the topographic data relating to the geographic area, analyze the topographic data to identify one or more characteristics, determine a location relating to a first wireless network device based at least in part on the analyzing, and/or determine one or more locations each relating to one or more other wireless network devices within the geographic area based at least in part on the location relating to the first wireless network device. In some embodiments, topographic data may include data obtained by the unmanned air vehicle in two or more directions.

Non-transitory computer-readable mediums storing computer-executable code are disclosed. In some embodiments, the code is executable by a processor to identify a geographic area, receive topographic data obtained by an unmanned air vehicle at a first predetermined height, the topographic data relating to the geographic area, analyze the topographic data to identify one or more characteristics, determine a location relating to a first wireless network device based at least in part on the analyzing, and/or determine one or more locations each relating to one or more other wireless network devices within the geographic area based at least in part on the location relating to the first wireless network device.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Wireless communication networks present distinct challenges, especially in actual deployment. Often theoretical wireless networks appear to sufficiently cover an entire area, but after installation additional testing reveals that they do not. Moreover, different wave frequencies such as millimeter waves (e.g., 60 GHz), rely to varying degrees on the wireless connection between two access points. If objects (such as buildings, homes, or trees) interfere with the wireless connection, then wireless transmissions may be severely limited, if they work at all.

Other methods and data types rely heavily on theoretical or inaccurate data instead of the types of actual data provided by the present systems and methods. The present systems and methods use unmanned air vehicles (UAVs), including, but not limited to drones, in a geographic area to capture topographic data at one or more heights. In some embodiments, these UAVs may employ Lidar-based data collection techniques, components, and/or methods among others. The captured data includes actual data that can be analyzed to determine many wireless network characteristics, including locations, positions, signal inhibitor, predictions, and/or sight paths, among other things. Under the present systems and methods, one or more network designs and/or orientations can be used to design wireless mesh networks, among other things. In some embodiments, the UAVs may incorporate the use of one or more data recording devices that may record data in multiple directions and/or in various combinations (i.e., serially, parallel, simultaneously, etc.).

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
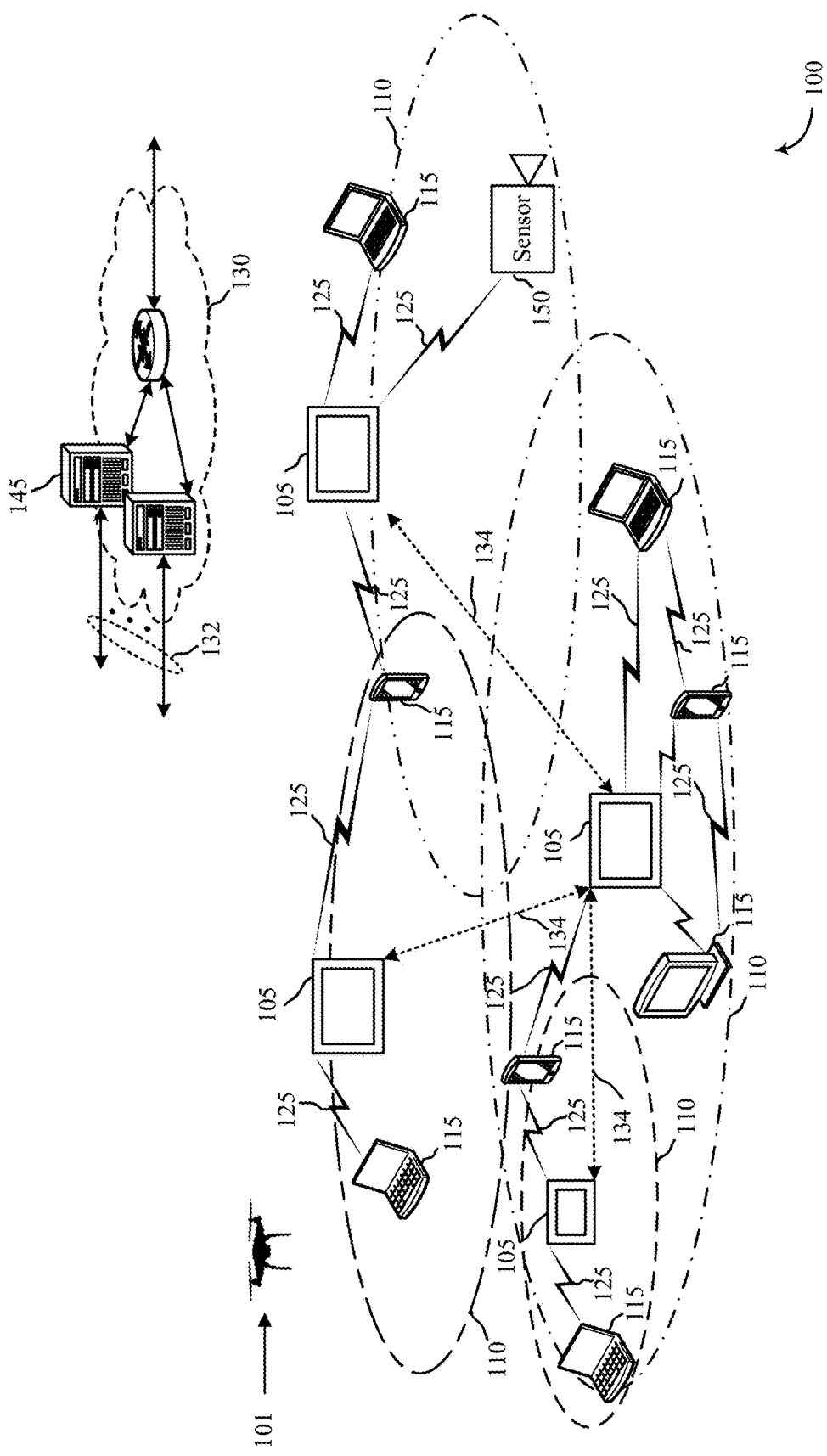
FIG. 1 shows a block diagram relating to wireless networking and communication systems, in accordance with various aspects of this disclosure.

FIG. 1 illustrates an example of a communications system 100 in accordance with various aspects of the disclosure. The communications system 100 may include one or more UAVs 101, access points (APs) 105, devices 115, a network 130, and/or sensors 150. The network 130 may provide user authentication, encryption, access authorization, tracking, Internet Protocol (IP) connectivity, and other access, calculation, modification, and/or functions. The APs 105 may interface with the network 130 through a first set of wired and/or wireless communication links 132 to communicate with one or more remote servers 145. The APs 105 may perform communication configuration, adjustment, and/or scheduling for communication with the devices 115, or may operate under the control of a controller. In various examples, the APs 105 may communicate—either directly or indirectly (e.g., through network 130)—with each other over a second set of wired and/or wireless communication links 134. APs 105 may communicate with a back end server (such as the remote servers 145)—directly and/or indirectly—using the first set of one or more communication links 132.

The APs 105 may wirelessly communicate with the devices 115 via one or more antennas. Each of the APs 105 may provide communication coverage for a respective geographic coverage area 110. In some examples, APs 105 may be referred to as a control device, a base transceiver station, a radio base station, an AP, a radio transceiver, or some other suitable terminology. The geographic coverage area 110 for a AP 105 may be divided into sectors making up only a portion of the coverage area. The communications system 100 may include APs 105 of different types. There may be overlapping geographic coverage areas 110 for one or more different parameters, including different technologies, features, subscriber preferences, hardware, software, technology, and/or methods. For example, each AP 105 may be related to one or more discrete structures (e.g., a home, a business) and each of the one more discrete structures may be related to one or more discrete areas. In other examples, multiple APs 105 may be related to the same one or more discrete structures (e.g., multiple APs relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The APs 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. A device 115 and/or a sensor 150 may be able to communicate through one or more wired and/or wireless connections with various components such as UAVs, APs, control panels, base stations, and/or network equipment (e.g., servers, wireless communication points, etc.) and/or the like. In some embodiments, the terms a control panel and a control device are used synonymously.

The communication links 125 shown in communications system 100 may include uplink (UL) transmissions from a device 115 to a AP 105, and/or downlink (DL) transmissions, from a AP 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, APs 105 and/or devices 115 may include one or more antennas for employing antenna diversity schemes to improve communication quality and reliability between APs 105 and devices 115. Additionally or alternatively, APs 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the AP 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, one or more UAVs 101 may be used to capture data relating to one or more components and/or elements contained in and/or described as relating to FIG. 1. In addition, in some embodiments, one or more UAVs 101 may be used to capture data relating to information relating to one or more components and/or elements contained in and/or described as relating to FIG. 1, including but not limited to location, position, orientation, direction, height, sight path (including information relating to actual, theoretical, relative and/or otherwise different), some combination, and/or other information. For example, one or more UAVs 101 may be used to capture location data relating to relative positions of two or more mesh network components such as APs, among others. In some embodiments, UAVs 101 may include and/or perform one or more capabilities, functions, and/or features discussed as pertaining to one or more other communications system 100 components, such as APs 105, among others.

Figure 2:
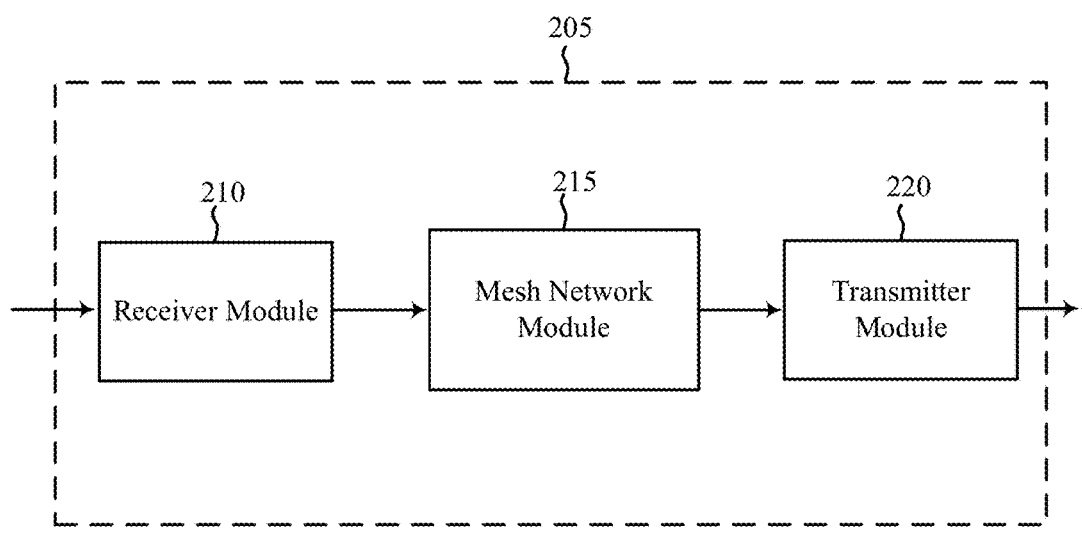
FIG. 2 shows a block diagram of a component relating to wireless networking and communication systems, in accordance with various aspects of this disclosure.

FIG. 2 shows a block diagram 200 of a UAV 205 for use in electronic communications, in accordance with various aspects of this disclosure. UAV 205 may be an example of one or more aspects of AP 105 described with reference to FIG. 1, among others. UAV 205 may be an example of one or more aspects of remote server 145 described with reference to FIG. 1, among others. UAV 205 may be an example of one or more aspects of other components described with reference to FIG. 1, among others. UAV 205 may include a receiver module 210, a mesh network module 215, and/or a transmitter module 220.

UAV 205 may include one or more of an ability to fly, hover, capture information, process information, transmit information, and/or perform other related operations. UAV 205 may include a location-awareness component to identify UAV 205's location either absolutely or relative to one or more other objects. For example, UAV 205 may include an ability to determine and/or to provide data to another device to determine UAV 205's location based, for example, on GPS data, Lidar data, camera data, some combination, and/or other data. In some embodiments, UAV 205 may be a drone, which may be autonomous to fly entirely on its own based on a program and/or adaptable based on related characteristics including heights, object sizes, locations, and/or other information, and/or may be partially and/or completely controlled by a human user, and/or some combination of these (autonomous and controlled), among other capabilities as understood by a person of ordinary skill in the art. UAV 205 may include a single propulsion device and/or multiple propulsion devices. In some embodiments, UAV 205 may also include a processor. Each of the different modules may be in communication with each other—directly and/or indirectly.

The components of the UAV 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to and/or capable of receiving information through wired and/or wireless connections from and/or relating to one or more components of communications system 100 including but not limited to APs 105, and/or device 115, remote servers 145, and/or information from UAV 205 (including from another module such as mesh network module 215), among others. Received information may include, but is not limited to, one or more instructions, coordinates, directions, areas, template designs, structures, organizations, orientations, data sets, some combination, and/or other information. Information may be passed on to the mesh network module 215, the transmitter module 220, and/or to other components of the UAV 205 and/or other components of a system, such as communications system 100, among others.

The mesh network module 215 may perform one or more operations relating to a UAV, an apparatus, an AP, a device, and/or a remote server (including, but not limited to, UAV 205, AP 105, device 115, and/or remote server 145, among others), that may be configured to, relate to, and/or capable of performing wireless network design-related functions based on applicable data, including, in some cases, data relating to a UAV. The operations, features, and methods relating to mesh network module 215 may be performed regardless of whether the system and/or a specific component includes a wireless mesh network device and/or which system component may perform a wireless network communication. References to a UAV 205 and/or a mesh network module 215 (and variations) include all functions, features, and capabilities disclosed with respect to other apparatuses, APs, remote servers, and devices, unless otherwise specifically noted.

The transmitter module 220 may transmit the one or more signals received from other components of UAV 205 and/or other components of any system, such as communications system 100. The transmitter module 220 may transmit geographic data, topography data, data that has an action performed on it, summaries, analyses, determinations, initiations, operations, instructions, alerts, statuses, errors, and/or other information relating to one or more system components, network design and/or organization, and/or wireless communication, among other things. In some examples, the transmitter module 220 may be collocated with the receiver module 210 in a transceiver module. In other examples, the transmitter module 220 may not be collocated with the receiver module 210 in a transceiver module. In some examples, the transmitter module 220 may be collocated with the mesh network module 215. In other examples, the transmitter module 220 may not be collocated with the mesh network module 215.

Figure 3:
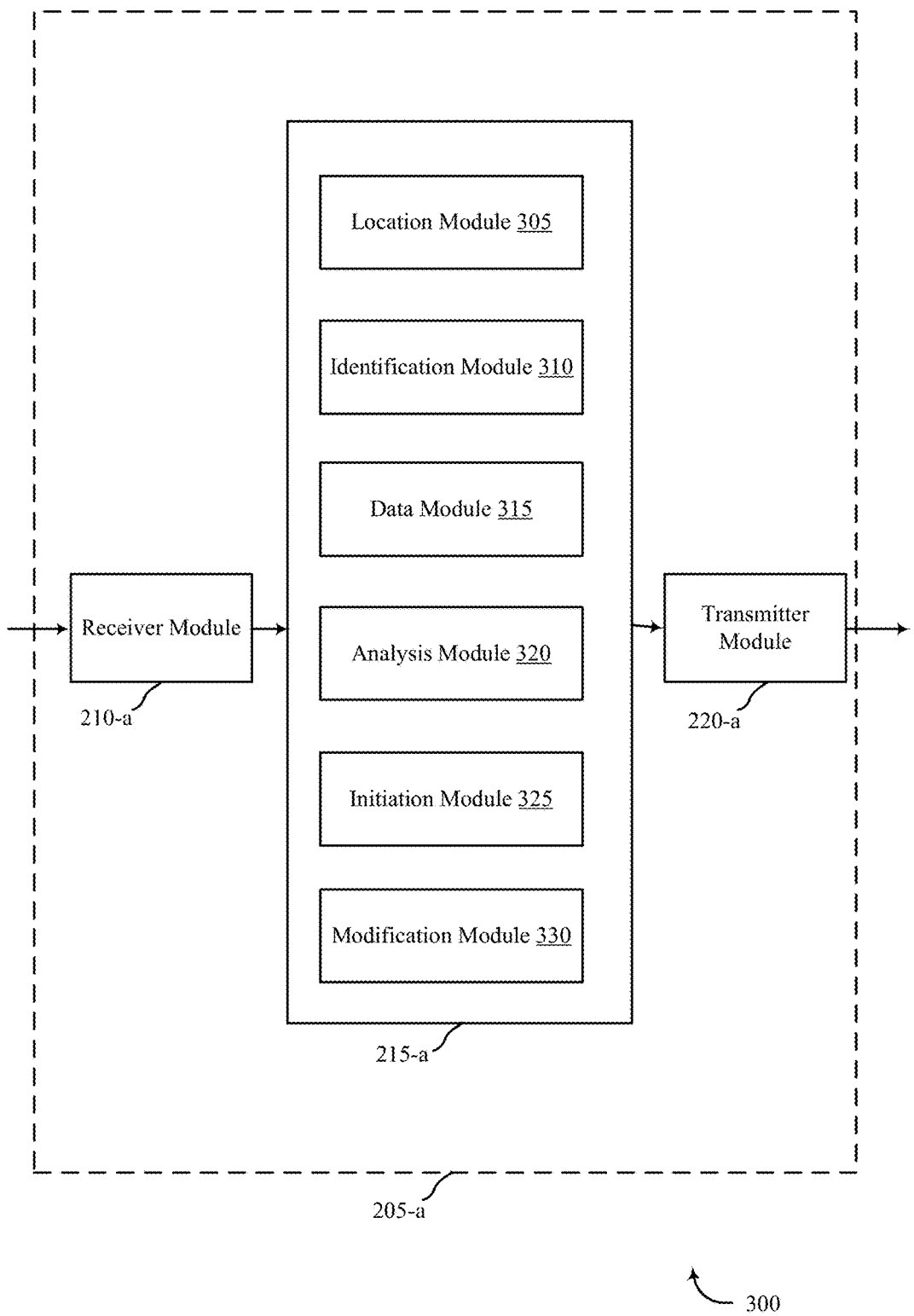
FIG. 3 shows a block diagram of a component relating to wireless networking and communication systems, in accordance with various aspects of this disclosure.

FIG. 3 shows a block diagram 300 of a UAV 205-a for use in wireless communication design, in accordance with various examples. The UAV 205-a may be an example of one or more aspects of an AP 105 described with reference to FIG. 1, among others. It may also be an example of a UAV 205 described with reference to FIG. 2, among others. The UAV 205-a may include a receiver module 210-a, a mesh network module 215-a, and/or a transmitter module 220-a, which may be examples of the corresponding modules of UAV 205. The UAV 205-*a* may also include a processor. Each of these components may be in communication with each other. The mesh network module 215-*a* may include, but is not limited to, a location module 305, identification module 310, data module 315, analysis module 320, initiation module 325, and/or modification module 330, among others. The receiver module 210-*a* and the transmitter module 220-*a* may perform the functions of the receiver module 210 and the transmitter module 220 of FIG. 2, respectively.

In some embodiments, any and/or all operations disclosed as relating modules relating to UAV 205 may be performed by other related system components, instead of by, in addition to, and/or concurrently by, UAV 205. For example, at least some operations described with respect to mesh network module 215-*a* and/or location module 305, identification module 310, data module 315, analysis module 320, initiation module 325, and/or modification module 330, among others, may be performed by an AP, a remote server, a user device, a control panel, some combination, and/or by another device. In this disclosure, discussion of actions and/or operations as performed by a UAV are not otherwise limiting.

The components of the UAV 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, mesh network module 215-*a* may include a location module 305. Location module 305 may perform one or more operations relating to location information and/or other information, among other things. Location module 305 may perform one or more operations relating to one or more other modules of mesh network module 215-*a*, including but not limited to identification module 310, data module 315, analysis module 320, and/or modification module 330, among others. Location module 305 may perform one or more operations relating to location information, including but not limited to locations, relative locations, and/or possible locations of structures, streets, sidewalks, UAVs, APs, backhaul lines, customer premises equipment (CPE), customer devices such as smart phones, and/or other things.

Among other things, location module 305 may perform one or more operations relating to past locations, current locations, potential future locations, theoretical locations, area locations, area location subsets, one or more relative locations, and/or projected locations, modeled locations, other location types, and/or some combination, among other things. In some embodiments, location module 305 may perform one or more operations, including but not limited to assessing, receiving, sorting, grouping, tracking, organizing, categorizing, placing, ordering, tracing, calculating, computing, estimating, and/or some combination, among others. In some embodiments, location module 305 may perform one or more operations discussed with respect to other modules of UAV 205-*a* and/or mesh network module 215, alone and/or in combination, with the UAVs, APS, apparatuses, and/or one or more other modules.

In some embodiments, location module 305 may receive location information relating to one or more geographic areas (e.g., blocks, streets, houses, neighborhoods, subsets of one or more groups, etc.) from another source and/or based on one or more operations, identifications, and/or determinations. In some embodiments, information from other sources collected, identified, and/or determined by the UAV may include, but is not limited to, coordinates, locations, directions, heights, relevant sectors, maps, topography, geography, related characteristics of a geographic area, signal inhibitor information, desired target areas and/or structures of interest, some combination, and/or other information.

In some embodiments, mesh network module 215-*a* may include an identification module 310. Identification module 310 may perform one or more operations relating to location information, geographic information, data, devices, and/or communications, among other things. Identification module 310 may perform one or more operations relating to one or more other modules of mesh network module 215-*a*, including but not limited to location module 305, data module 315, analysis module 320, initiation module 325, and/or modification module 330, among others.

Identification module 310 may perform one or more operations relating to location information and/or topography data, including but not limited to locations of structures, streets, sidewalks, APs, backhaul lines, customer premises equipment (CPE), customer devices such as smart phones and/or data, including but not limited to data relating to states, cities, municipalities, structures, streets, satellites, Lidar and/or radar (which may provide desired locations of one or more system components, such as APs, and/or sight paths between one or more locations), drones, sidewalks, elevations, terrain, orienteering information, connections and/or points between two or more objects and/or locations, vegetation (e.g., trees, bushes), property lines, city planning documents, zoning regulations, organization of one or more objects, neighborhoods, regulations, covenants, ordinances, physical characteristics (e.g., reflectivity, height, width, depth), traffic direction, structure spacing, subsets of one or more areas, relative positions of structures and/or other objects, APs, backhaul lines, customer premises equipment (CPE), customer devices such as smart phones, some combination, etc.

Among other things, identification module 310 may perform one or more operations relating to past locations and/or data, current locations and/or data, potential future locations and/or data, theoretical locations and/or data, area locations and/or data, area location subsets and/or data, one or more relative locations and/or data, projected locations and/or data, modeled locations and/or data, other location types and/or data, and/or combinations of some and/or all of these, among other things. In some embodiments, identification module 310 may perform one or more operations, including but not limited to identifying, classifying, recognizing, detecting, distinguishing, characterizing, discovering, associating, connecting, relating, assessing, receiving, calculating, computing, estimating, and/or some combination, among others. In some embodiments, identification module 310 may perform one or more operations discussed with respect to other modules of UAV 205-*a* and/or mesh network module 215, alone and/or in combination, with the apparatus and/or the one or more other modules.

In some embodiments, identification module 310 may identify the location of two or more objects, positions, and/or points, among other things. For example, identification module 310 may identify UAV 205's location relative to a desired first location, including a first predetermined height, which may relate to one or more structures, geographic areas, and/or positions, among other things. In some embodiments, identification module 310 communicate with data module 315 (described below) to identify characteristics based on and/or independent from data related to data module 315.

In some embodiments, identification performed by identification module 310 may include identifying one or more landmark and/or starting positions, which may relate to information from location module 305 and/or may be independent from location module 305. This identifying may include identifying one or more landmarks relating to one or more structures, APs, user devices, signal inhibitors, and/or points based at least in part on other operations, including but not limited to analysis performed by analysis module 320. In some embodiments, identification may include identifying one or more AP locations (including actual, theoretical, and/or projected). This identifying may be based at least in part on other operations, including but not limited to analysis performed by analysis module 320 and/or operations performed by one or more other modules of mesh network module 215-a.

In some embodiments, mesh network module 215-a may include a data module 315. Data module 315 may perform one or more operations relating to geographic, topographic, and/or other data, among other things. Data module 315 may perform one or more operations relating to geographic, topographic, and/or other data, including but not limited to data relating to states, cities, municipalities, structures, streets, satellites, Lidar, user devices, sidewalks, elevations, radar, distance determining technology, terrain, orienteering information, connections and/or points between two or more objects and/or locations, vegetation (e.g., trees, bushes), property lines, range finding technology, zoning regulations, organization of one or more objects, neighborhoods, regulations, covenants, ordinances, physical characteristics (e.g., reflectivity, height, width, depth, construction materials, physical properties), traffic direction, structure spacing, subsets of one or more areas, relative positions of structures and/or other objects, APs, backhaul lines, customer premises equipment (CPE), customer devices such as smart phones, some combination, and/or other information.

Among other things, data module 315 may perform one or more operations relating to past data, current data, potential future data, theoretical data, calculated data, area data, video data, audio data, climate data, temperature data, weather data, area data subsets, one or more relative data sets, and/or projected data, modeled data, other types, and/or some combination, among other things. In some embodiments, data module 315 may perform one or more operations, including but not limited to assessing, receiving, capturing, recording, sorting, grouping, tracking, organizing, categorizing, placing, ordering, tracing, calculating, computing, estimating, and/or some combination, among others. In some embodiments, data module 315 may perform one or more operations discussed with respect to other modules of UAV 205-a and/or mesh network module 215, alone and/or in combination, with the apparatus and/or the one or more other modules. In some embodiments, data module 315 may capture and/or record multiple data types serially, in parallel, simultaneously, etc. In some embodiments, data module 315 may capture and/or record data in multiple directions (e.g., vertically, between vertical and horizontal, horizontally, between 0 degrees and 90 degrees, between 0 and 180 degrees) and/or based on a 360 degree view from one or more points.

In some embodiments, mesh network module 215-a may include an analysis module 320. Analysis module 320 may perform one or more operations relating to location information, data, devices, and/or communications, wireless communications, among other things. Analysis module 320 may perform one or more operations relating to one or more other modules of mesh network module 215-a, including but not limited to location module 305, identification module 310, and/or data module 315, among others.

Analysis module 320 may perform one or more operations relating to location information and/or relating to data relevant to data module 315 (among other information), including but not limited to analyzing locations and/or data relating to structures, vertical data, horizontal data, data between vertical and horizontal data, relative directions, relative parallel direction, relative orthogonal direction, streets, sidewalks, APs, backhaul lines, customer premises equipment (CPE), customer devices such as smart phones and/or data, including but not limited to data relating to states, cities, municipalities, structures, streets, satellites, Lidar, direction data, relative distances between any two or more points (such as the distance found by using a rangefinder), relative cardinal directions (e.g., northeast vs. northwest, 120 degrees vs. 150 degrees from a common references point, etc.) UAV data, video, audio, climate, sidewalks, elevations, terrain, orienteering information, one or more points on a roof, a highest roof peak, a roof peak point relating to a line of sight path relating to one or more other positions, connections and/or points between two or more objects and/or locations, vegetation (e.g., trees, bushes), property lines, zoning regulations, organization of one or more objects, neighborhoods, regulations, covenants, ordinances, physical characteristics (e.g., reflectivity, height, width, depth), traffic direction, structure spacing, subsets of one or more areas, relative positions of structures and/or other objects, UAVs, APs, backhaul lines, customer premises equipment (CPE), customer devices such as smart phones, network performance information including but not limited to notifications related to one or more components and/or elements, characteristics, parameters, actual data, interference data, calculated data, projected data, channel information, and/or some combination, etc.

Among other things, analysis module 320 may perform one or more operations using one or more algorithms, processes, and/or steps. For example, analysis module 320 may analyze video, Lidar, image, and/or other data to determine edges, materials, structures, shapes, borders, roofs, buildings, trees, sidewalks, electronic equipment, and/or other information using the present systems and methods.

Among other things, analysis module 320 may perform one or more operations relating to past locations and/or data, current locations and/or data, potential future locations and/or data, theoretical locations and/or data, area locations and/or data, area location subsets and/or data, one or more relative locations and/or data, projected locations and/or data, modeled locations and/or data, other location types and/or data, relative height of one or more points in and/or relating to a geographic area, data relating to one or more trends, correlations, patterns, designs, models, organizations, configurations, and/or combinations of some and/or all of these, among other things.

In some embodiments, analysis module 320 may perform one or more operations, including but not limited to analyzing, examining, evaluating, comparing, calculating, correlating, linking, matching, relating, contrasting, assembling, identifying, detecting, distinguishing, characterizing, discovering, associating, connecting, assessing, receiving, computing, estimating, and/or some combination, among others. In some embodiments, analysis module 320 may perform one or more operations discussed with respect to other modules of UAV 205-a and/or mesh network module 215, alone and/or in combination, with the UAV and/or the one or more other modules.

In some embodiments, mesh network module 215-a may include an initiation module 325. Initiation module 325 may perform one or more operations related to information and/or data related to and/or separate from other modules of mesh network module 215-a. Initiation module 325 may perform one or more operations because of, based in whole and/or in part on, related to, and/or separate from one or more other modules of mesh network module 215-a. For example, initiation module 325 may initiate one or more operations relating to one or more system components based on one or more operations related to analysis module 320, among other things.

As an example, if analysis module 320 analyzes geographic area and/or topography data and determines one or more results, initiation module may perform one or more operations based at least in part on the one or more results. Initiation module 325 may perform the one or more initiation actions automatically, after a period of time, based on user preferences, based on system performance, based on performance relating to one or more devices within a system, based on one or more constraints, and/or some combination, among other things. For example, based at least in part on analysis module 320 analyzing geographic area and/or topography data and determining one or more results, initiation module 325 may initiate and/or generate one or more representations, simulations, examples, and/or versions of a geographic area (among other things) and relating to one or more wireless network designs, and/or may initiate and/or generate one or more actions relating to one or more components, including but not limited to a UAV, an AP, a CPE, a backhaul link, a remote server, an apparatus, a control panel, and/or some combination, among others.

As another example, initiation module 325 may initiate movement of a UAV (e.g., UAV 205) based at least in part on one or more actions performed by one or more other modules of mesh network module 215-a, among others. In these scenarios, UAV 205 may move to gather additional data, if initiated to do so by initiation module 325. Unless otherwise noted "based on," includes based solely on and based at least in part on, as used in this disclosure. Examples of initiated actions may include but are not limited to rotations, elevations, lateral movements, spins, orientations, modifications, changing locations, modifying operations, adding and/or omitting one or more steps, alternating, calculations, adapting, varying (including randomly and/or pseudo-randomly), initiating, cancelling, pausing, powering on, powering off, communicating, capturing, enabling, restarting, some combination, and/or other functions.

In some embodiments, initiation module 325 may also initiate one or more operations of one or more other system components. For example, initiation module 325 may initiate one or more operations, such as determining, by one or more remote servers and/or user devices. This initiation may be performed based on a wired and/or a wireless communication link between UAV 205-a and one or more other system components, including, but not limited to, an AP, a UAV, a device, a remote server, some combination, and/or other components.

In some embodiments, mesh network module 215-a may include a modification module 330. In some embodiments, modification module 330 may modify one or more operations related to one or more components of a system, such as communications system 100. For example, modification module 330 may adjust the operation of an AP, a UAV, a user device, and/or a remote server (among other components elements, and/or devices). In some embodiments, modification may include modifying an actual and/or a relative frequency, channel, field of view, height, first predetermined height, second predetermined height, location, position, orientation, sight path, communication direction, power, communication characteristic, location of and/or relating to a component, a performance parameter, a performance characteristic, a time, an output, a protocol, a sensitivity, a predetermined threshold level, a scheduled monitoring, a capturing of different and/or additional data, and/or other operations.

Modification module 330 may additionally or alternatively modify the operation of multiple components (e.g., APs, UAVs, devices, apparatuses, remote servers, some combination) and/or elements, based on a single input and/or multiple inputs. Modification module 330 may additionally or alternatively modify the operation of one or more modules, analyses, and/or algorithms relating to one or more methods and/or operations that relate to one or more components (e.g., APs, UAVs, devices, apparatuses, remote servers, some combination) and/or elements, based on a single input and/or multiple inputs. For example, modification module 330 may adjust the operation of a UAV 205 relative to a location relating to a first AP 105, a device 115, and a second AP 105 based at least in part on data and/or information relating to a first AP 105, a device 115, and a second AP 105 (among others), including but not limited to height, position, orientation, direction, view, recording, capture, channel use, performance, alerts, instructions, and/or other information. In some embodiments, a performance indicator may include a performance parameter and/or a performance characteristic.

In some embodiments, adjustment may include adjusting a direction, such as adjusting a direction of UAV 205. As an example, adjusting a direction of one or more system components and/or elements may be based at least in part on a location of user device, locations of multiple user devices, and/or other information, including but not limited to other locations.

In some embodiments, at least some of the operations relating to UAV 205-a, including but not limited to operations relating to mesh network module 215-a, may be performed in one or more layers of open system interconnection. In some embodiments, at least some of the operations relating to UAV 205-a, including but not limited to operations relating to mesh network module 215-a, may be performed in the lower and/or the upper MAC layers, among others.

Figure 4:
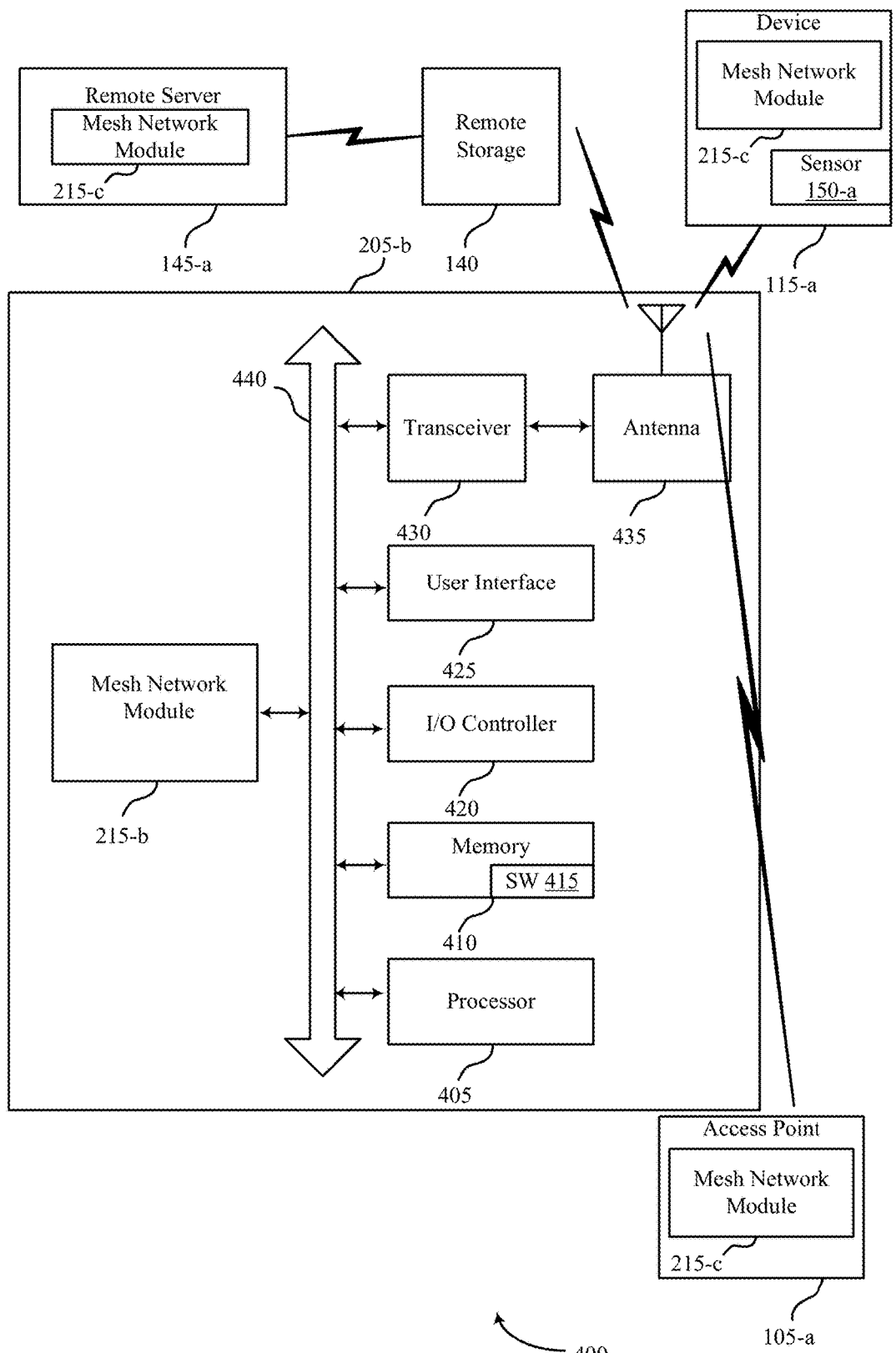
FIG. 4 shows a block diagram of components relating to wireless networking and communication systems, in accordance with various aspects of this disclosure.

FIG. 4 shows a system 400 for use in mesh network design systems, in accordance with various examples. System 400 may include a UAV 205-b, which may be an example of one or more aspects of the APs 105 of FIG. 1. UAV 205-b may also be an example of one or more aspects of UAV 205 and/or UAV 205-a of FIGS. 2 and 3. In addition, each of the elements, capabilities, and/or actions described as related to and/or performed by UAV 205 may also be attributed to, related to, and/or performed by other system components, including but not limited to, remote server 145-*a*, remote storage 140, device 115-*a*

In some embodiments, UAV 205-*b* may include mesh network module 215-*b*, which may be an example of mesh network module 215 described with reference to FIG. 2, among others. UAV 205-*b* may include mesh network module 215-*b*, which may be an example of mesh network module 215-*a* described with reference to FIG. 3, among others. In some embodiments, one or more other system components may include mesh network module 215-*c*, which may be an example of mesh network module 215 described with reference to FIG. 2, among others. One or more other system components may include mesh network module 215-*c*, which may be an example of mesh network module 215-*a* described with reference to FIG. 3, among others.

UAV 205-*b* may also include components for and/or enabling bi-directional voice and/or data communications including components for transmitting communications and components for receiving communications. For example, UAV 205-*b* may communicate bi-directionally with one or more of device 115-*a*, one or more sensors 150-*a*, remote storage 140, and/or remote server 145-*a*, which may be an example of the remote server of FIG. 1, among other things. This bi-directional communication may be direct (e.g., UAV 205-*b* communicating directly with remote storage 140) or indirect (e.g., UAV 205-*b* communicating indirectly with remote server 145-*a* through remote storage 140).

The UAV 205-*b* may include a mesh network module 215-*b*, which may perform the functions described above for the mesh network modules 215 of UAV 205 of FIGS. 2 and 3, among others. The UAV 205-*b* may also include other features and/or capabilities as related to the present systems and methods of this disclosure.

UAV 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote storage 140, and/or remote server 145-*a*. The transceiver module 430 may include a modem to modulate the packets and provide the modulated packets to the one or more antennas 435 for transmission, and to demodulate packets received from the one or more antenna 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of UAV 205-*b* (e.g., one or more antennas 435, transceiver module 430, etc.) may provide a direct connection to a remote server 145-*a* via a direct network link to the Internet via a POP (point of presence). In some embodiments, one element of UAV 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., gyroscope, piezoelectric, altitude, wind speed, tilt, speed, accelerometer, motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of UAV 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., identifying geographic area, receiving and/or capturing topographic data, analyzing one or more data sets, determining characteristics, determining location, determining sight paths, determining network design, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the mesh network module 215-*b* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-*b*) may include a single antenna 435, the control panel or control device (e.g., 205-*b*) may have multiple antennas 435 capable of concurrently transmitting and/or receiving multiple wireless transmissions.

Figure 5:
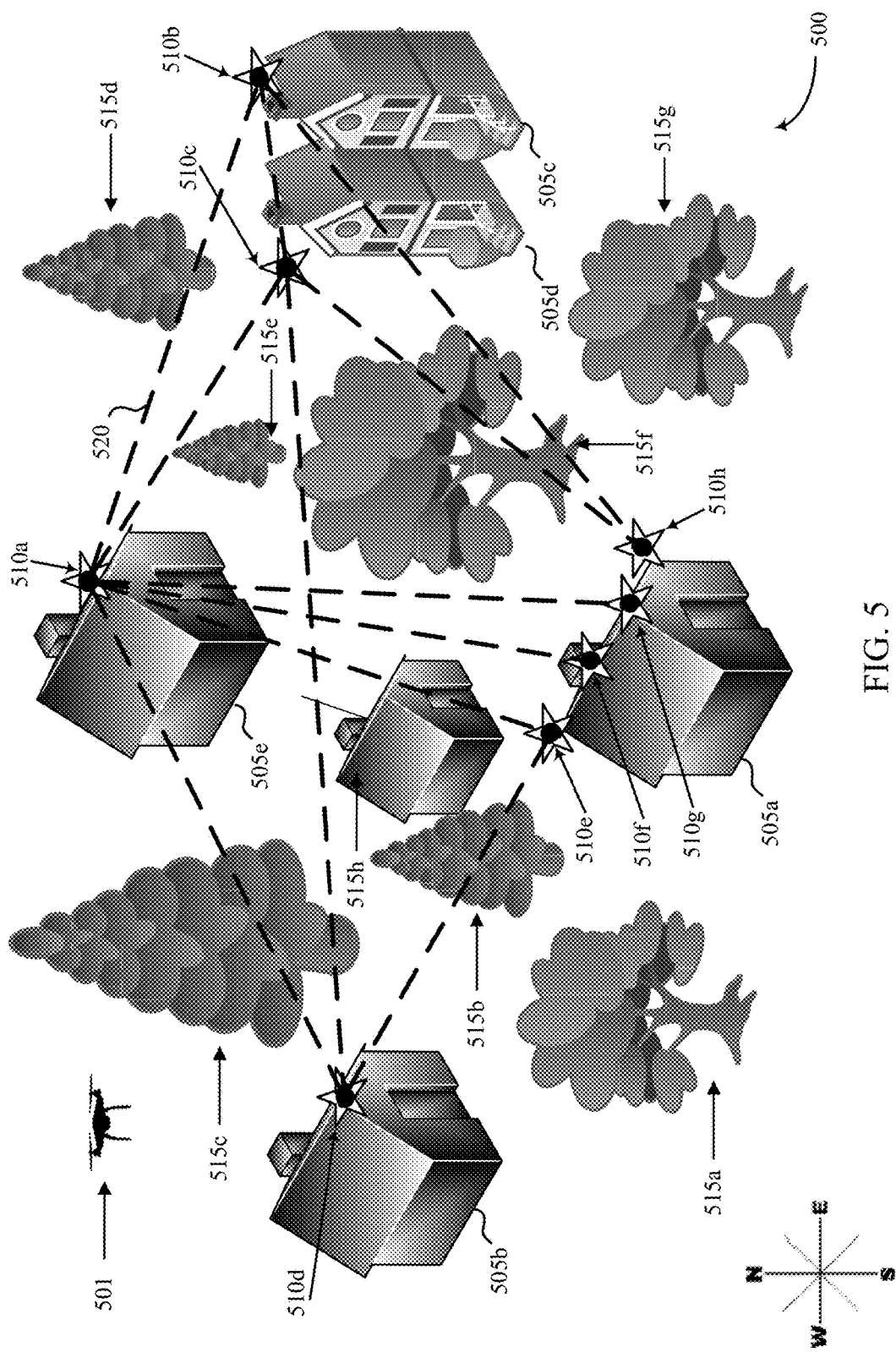
FIG. 5 shows designs illustrating exemplary components and methods relating to wireless networking and communication systems, in accordance with various aspects of this disclosure.

FIG. 5 illustrates examples of system 500 in accordance with the present systems, apparatuses, and methods. In some embodiments, one or more components of system 500 may include the same, similar and/or different functions, characteristics, performance, and/or other information relating to other systems, APs, UAVs, devices, apparatuses, remote servers, and/or modules related to this disclosure, including those relating to FIGS. 1-4 and 6-12. In some embodiments, system 500 may include positions 510*a* through 510*g* (stars), sight paths 520 (dotted lines), UAV 501, structures 505*a* through 505*e*, inhibitors 515*a* through 515*h* (e.g., trees, buildings, structures, etc.), some combination, and/or other components, including other components from other systems such as communications system 100.

In some embodiments, positions 510*a* through 510*g* may indicate actual, theoretical, determined, identified, and/or other locations for possible APs and/or APs, among other components and/or things. In some embodiments, UAV 501 will be positioned at one or more positions, such as positions 510*a* through 510*g*. In some embodiments, UAV 501 will be positioned above a structure (e.g., 505*a*) and may capture one more data types at one or more predetermined heights. In some embodiments, the one or more predetermined heights may be actual, relative, and/or some combination. For example, UAV 501 may be able to capture and/or transmit data at multiple points relative to a structure (e.g., 505*a*), a ground position, a distance (e.g., a distance from inhibitor 515*f*, which may be a tree, or between two points such as AP position 510*h* and 510*b*), some combination, and/or other things. For example, UAV 501 may capture data at a potential AP position and determine one or more (and/or every) sight path from the potential position, including determining the current and/or the probability of future sight paths from the potential position based on analyzing one or more characteristics, including those relating to inhibitors.

Note, as used in this disclosure, use of the term "capture" should not be construed as limiting other elements, function, ability, and/or discussion. A UAV may capture, record, transmit, photograph, and/or perform any number of operations relating to data as understood by a person of ordinary skill in the art.

In some embodiments, UAV 501 may have and/or receive instructions, directions, and/or other information about a geographic area, such as the area shown in FIG. 5. This information may instruct, direct, and/or otherwise notify UAV 501 to begin at a first position (e.g., above structure 505*a*). This first position may relate to landmarks, coordinates, a direction and a heading, may be automatically calculated, may be user controlled, may be based on information received from a remote server with a database, some combination, and/or other sources. In some embodiments, UAV 501 may capture data at multiple positions relating to a structure. For example, UAV 501 may first capture data at a lowest point position of a roofline (e.g., position 510*h*). Additionally and/or alternatively, UAV 501 may first capture data at a highest point position of a roofline on the same side and/or on a different side, end, and/or direction (e.g., position 510*g*, position 510*e*).

In some embodiments, at each location UAV 501 may collect data in one or more directions using one or more cameras, sensors, emitters, receivers, some combination, and/or others. For example, UAV 501 may include one or more cameras able to capture visual data in a vertical direction (e.g., from UAV 501's position relative to the ground below). As another example, UAV 501 may include one or more cameras able to capture visual data in a horizontal direction (e.g., from UAV 501's position relative to the horizon or another structure). In addition, UAV 501 may include one or more cameras able to capture visual data in multiple directions in parallel, in series, simultaneously, and/or some combination. In other embodiments, one or more other sources of data may be analyzed in conjunction with, independent of, and/or related to UAV data. In some embodiments, these one or more other sources of data may include map data, satellite/aerial data, plan data, image data from one or more sources, some combination, and/or other information.

Additionally and/or alternatively, for example, UAV 501 may include one or more emitters and/or detectors to capture Lidar data in a vertical direction (e.g., from UAV 501's position relative to the ground below). As another example, UAV 501 may include one or more emitters and/or detectors to capture Lidar data in a horizontal direction (e.g., from UAV 501's position relative to the horizon or another structure). As another example, UAV 501 may include one or more emitters and/or detectors to capture Lidar data in a 45 degree direction (e.g., from UAV 501's position relative to the horizon or another structure). In addition, UAV 501 may include one or more emitters and/or detectors to capture Lidar data in multiple directions in parallel, in series, simultaneously, and/or some combination.

In some embodiments, UAV 501 may capture data at discrete three-dimensional positions (e.g., at positions 510*h*, 510*g*, 510*f*, 510*d*, 510*a*, etc.) and/or continuously capture data moving between positions (e.g., capturing data between positions 510*h*, 510*c*, 510*b*, 510*a*, etc.).

In some embodiments, UAV 501 may capture horizontal data at locations determined as possible AP positions. In some embodiments, UAV 501 may be used to actually determine and/or calculate sight paths between a first position and one or more second positions. For example, UAV 501 may be positioned at a predetermined height (e.g., 1 foot, 2 feet) at position 510*a* above structure 505*e*. UAV 501 may then capture data relating to possible sight paths between its current position and other positions of interest (e.g., 510d, 510e, 510f, 510g, 510c, etc.). In some embodiments, UAV 501 may capture data relating to sight paths and later operations may identify applicable line of sight paths based at least in part on the UAV 501 data.

As an example, in some embodiments, UAV 501 may be positioned at a predetermined height (e.g., 3 feet) above position 510d and oriented in a northeast direction toward position 510a. UAV 501 may capture data relating to a sight path 520 between its current position and position 510a and/or position 510d and position 510a. This actual, non-theoretical view, may provide valuable data (and related analysis) about the current and/or future viability of the corresponding sight path at this time and/or at a later time.

For example, if inhibitor 515c is a mature tree that has reached its full growth height and the sight path still exists then the network may be designed with this knowledge in mind. As another example, if inhibitor 515c is a mature tree that has reached its full growth height and there is a line of sight of sufficient size (e.g., 1 meter, 2 meters, 3 meters, etc.) between an upper and a lower branch, then the sight path still exists and the network and/or any adjustment may be designed with this knowledge in mind. As these examples demonstrate, such knowledge may provide valuable information over other data types that would miss such details, and can provide for a more robust and accurate wireless network design based on actual data relating to actual designated, possible, probable, theoretical, and/or already-used AP positions.

In addition, UAV 501 may capture data relating to other objects in one or more fields of view and/or at various directions. For example, UAV 501 may capture data relating to signal inhibitors (e.g., 515a through 515h), structures (e.g., 505a through 505e), currently existing wireless and/or wired communication elements (e.g., APs relating to one or more of 505a through 505e), some combination, and/or other information. In some embodiments, as discussed with respect to FIG. 3, among others, UAV 501 and/or another system component such as a remote server may be able to identify, distinguish, determine, and/or otherwise analyze the data captured by UAV 501 to determine and/or identify (among other operations) one or more characteristics, features, attributes, positions, and/or patterns. This analysis may occur in real time, pseudo real time, at intervals, after UAV has partially and/or fully traversed a geographic area, some combination, and/or at other times. These operations may relate to identifying one or more parts of one or more signal inhibitors and/or structures (among other things), identifying spatial relationships between two or more objects, identifying spatial relationships between one or more locations (e.g., positions 510d and 510a), a specific type and/or other characteristic of an object (e.g., a type of signal inhibitor, distinguishing between various types of structures, etc.), some combination, and/or other things.

In some embodiments, analyzed topographic data characteristics may include identifying and/or determining information relating to elevations, locations, textures, colors, tree type, structure type, height, width, average mature features, open space for additional development and/or planting, relative distances, roads, sidewalks, paths, shades, shapes, patterns, trends, orientations, shadowing, sizes, reflectivity, structure type, data relating to one or more geographic areas, some combination, and/or others. In addition, in some embodiments, topography data and/or related characteristics may include, but are not limited to, changes, differences, comparisons, determinations, and/or identifications relating to relative characteristics of one or more objects within a geographic area, including actual objects present (and/or previously present), projected objects relating to potential system and/or other designs, some combination, and/or others.

In some embodiments, one or more elements of a system (e.g., communications system 100) may analyze one or more sets of data and perform predictive patterning and/or determinations relating to actual and/or possible characteristics within a geographic area that may change over time, based at least in part on topographic data. For example, UAV 501 may capture data relating to a signal inhibitor, such as a tree (e.g., 515b). The UAV 501 (and/or some other system component) may analyze certain data to determine, calculate, compare, look up, and/or other evaluate one or more characteristics relating to the tree (and/or other inhibitor), including but not limited to type, size, average mature size, relative age, likely growth pattern, relative distance between different inhibitors (including whether additional inhibitors, such as more townhouses, can be added based on the footprint/design of current inhibitors), some combination, and/or others.

In addition, the UAV 501 (and/or some other system component) may analyze certain data to determine, calculate, compare, look up, and/or other evaluate one or more characteristics relating to multiple inhibitors (e.g., 515a, 515b, 515h), including calculating, predicting, determine, relating, and/or evaluating (among other things). For example, one or more system components may evaluate the relationship between inhibitors 515b and 515a, including among other things determining how additional growth over time may impact one or more sight paths between positions 510d and/or other positions (e.g., 510a, 510e). In some embodiments, this analysis may be based on database information relating to past UAV and/or other data from other geographic areas, from the same geographic areas, from Internet resources relating to tree growth and size, past calculations and/or analyses, some combination, and/or other information.

In some embodiments, at least some of positions 510a through 510g may each be a location that includes an AP and/or another system component. When an AP is present this AP may be the same, similar and/or different from APs discussed in this disclosure and may have one or more of the same, similar, and/or different capabilities and/or functions as explained in this disclosure. In some embodiments, one or more APs at one or more of positions 510-a through 510g may facilitate, permit, enable, route, and/or otherwise influence and/or modify communications, including wired and/or wireless communications. In these embodiments, one or more UAVs may be used to determine performance characteristics, identify problems, determine modifications to be made based on one or more parameters and/or characteristics, can be used to troubleshoot recurring network difficulties and/or problems, some combination, and/or other actions.

Figure 6:
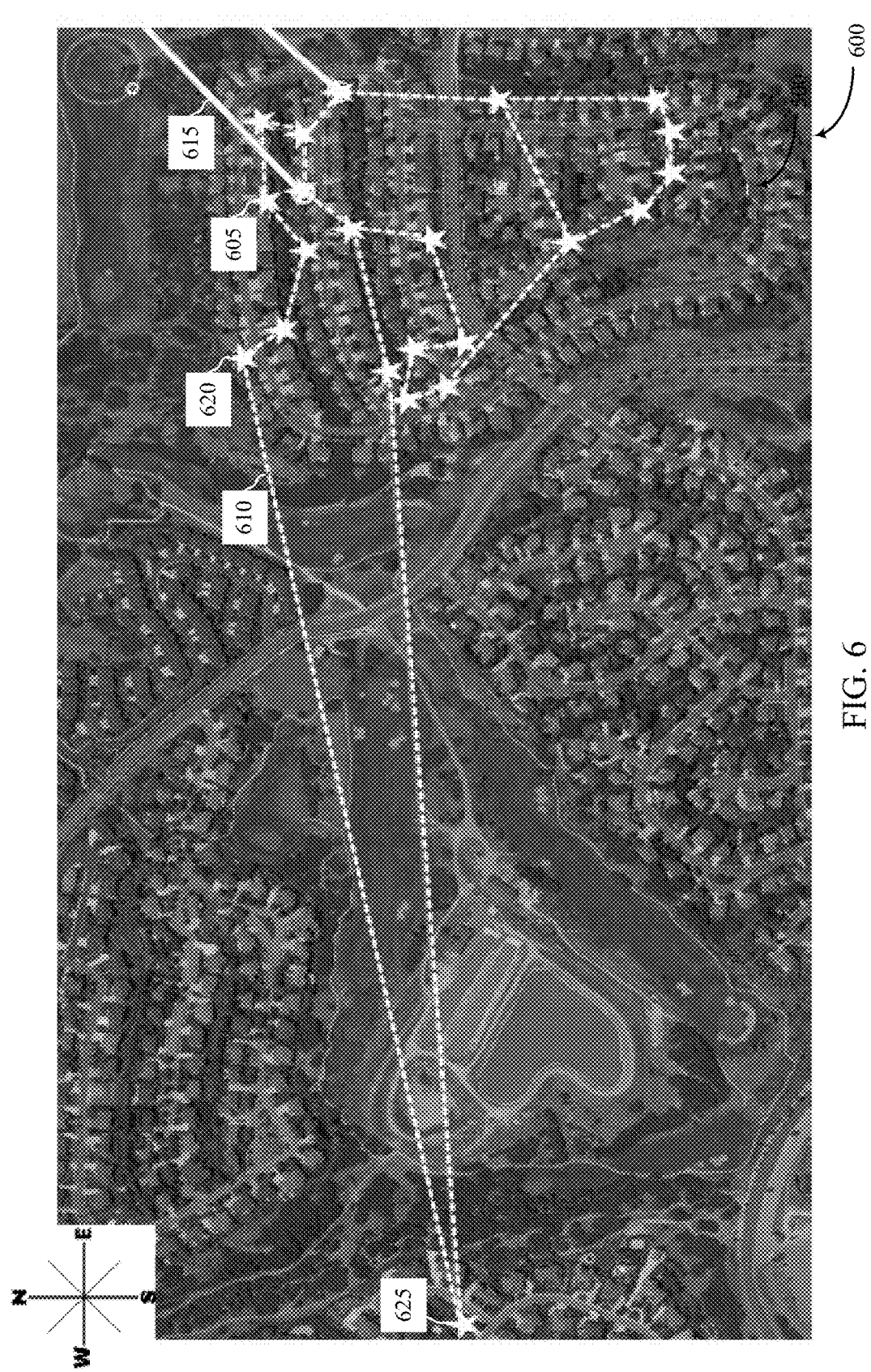
FIG. 6 shows designs illustrating exemplary components and methods relating to wireless networking and communication systems, in accordance with various aspects of this disclosure.

FIG. 6 illustrates examples of system 600 in accordance with the present systems, apparatuses, and methods. In some embodiments, one or more components of system 600 may include the same, similar and/or different functions, characteristics, performance, and/or other information relating to other systems, positions, inhibitors, APs, devices, apparatuses, remote servers, and/or modules related to this disclosure, including relating to FIGS. 1-5 and 7-12. In some embodiments, system 600 may include positions 605, 620, 625 (depicted as stars), sight paths 610 (dotted white lines), backhaul connections 615 whether actual and/or theoretical (solid white lines), and/or other components.

In some embodiments, positions 605 may include positions of actual APs and/or may be potential AP positions, and/or some combination. Actual APs may include the same, similar and/or different APs having one or more of the same, similar, and/or different capabilities and/or functions. In some embodiments, APs may facilitate, permit, enable, route, and/or otherwise influence and/or modify communications, including wired and/or wireless communications.

In some embodiments, sight paths 610 may include at least some already-existing wired communication lines. In some embodiments, sight paths 610 may include at least some already-existing. In some embodiments, sight paths 610 may include only potential line of sight paths.

In some embodiments, a UAV may capture data relating to one or more positions 605 depicted in FIG. 6. Based at least in part on the actual data collected by the UAV at one or more predetermined heights relative to at least some of the positions 605, a possible mesh network architecture may be created. This architecture may include determining every line of sight path between one structure and another structure (as exemplified in at least some of FIGS. 5-10). In addition, this architecture may relate to one or more actual and/or potential system components, including APs, backhaul connections (e.g., 615), and/or others.

In some embodiments, at least some of positions 605 in FIG. 6 may relate to positions of special interest. In some embodiments, these positions 605 may relate to actual current customers, preferred positions for network design, non-preferred positions for network design, identified hub positions, identified positions to maintain sight paths 610 (e.g., positions relating to across the golf course that is not likely to change over time), some combination, and/or others.

In some embodiments, one or more sight paths 610 may include non-millimeter wave communications. In some embodiments, the sight paths 610 may only include non-millimeter wave communications. In some embodiments, these non-millimeter wave communications may include communications within the 5 GHz band, among others. Unless otherwise specifically noted, discussion of any wireless, non-millimeter wave communications may apply to any frequency or band in the non-millimeter wave range. In some embodiments, using non-millimeter wave communication may facilitate relatively long range communications between one or more APs and/or other system components, as depicted in FIG. 6 by the sight paths 610 across the golf course connecting the positions 620 and 625, among others.

In some embodiments, one or more sight paths 610 may include millimeter wave communications. In some embodiments, the sight paths 610 may only include millimeter wave communications. In some embodiments, these millimeter wave communications may include communications within the 60 GHz band, among others. Unless otherwise specifically noted, discussion of any wireless, millimeter wave communications may apply to any frequency or band in the millimeter wave range. In some embodiments, using millimeter wave communication may facilitate relatively long range communications based on one or more lines of sight between one or more APs and/or other system components, as depicted in FIG. 6 by the sight paths 610 across the golf course connecting the positions 620 and 625, among others.

Figure 7:
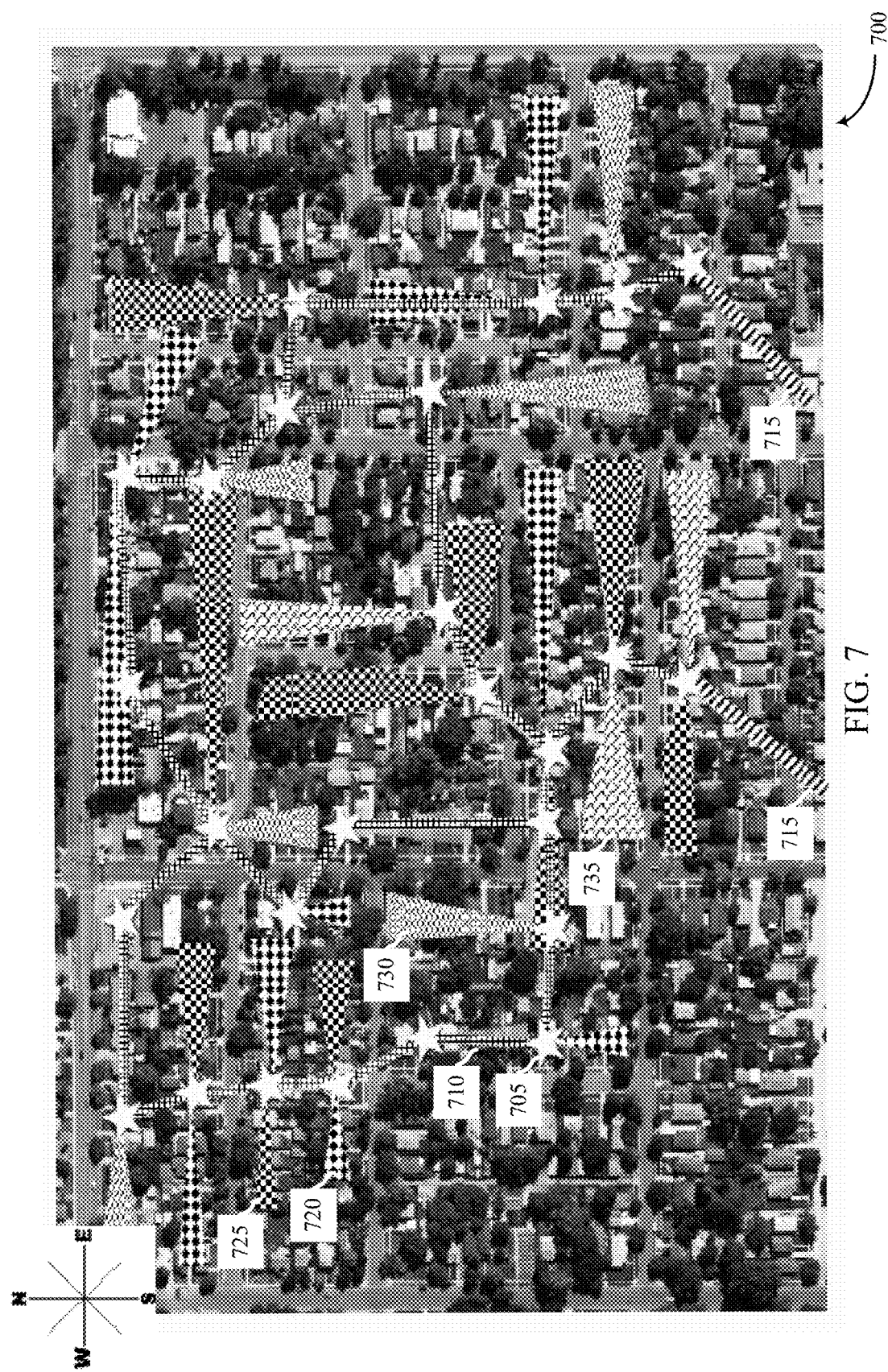
FIG. 7 shows designs illustrating exemplary components and methods relating to wireless networking and communication systems, in accordance with various aspects of this disclosure.

FIG. 7 illustrates examples of system 700 in accordance with the present systems, apparatuses, and methods. In some embodiments, one or more components of system 700 may include the same, similar and/or different functions, characteristics, performance, and/or other information relating to other systems, APs, UAVs, devices, apparatuses, remote servers, and/or modules related to this disclosure, including relating to FIGS. 1-6 and 8-12. In some embodiments, system 700 may include positions 705 (depicted as stars), communication lines 710 (crosshatched), backhaul connections 715 (striped), exemplary mesh network communication signals (e.g., 720, 725, 730, and 735), and/or other components.

FIG. 7 provides examples relating to a wireless network, such as a mesh network design, based on the present systems and methods. Based at least in part on the UAV data and/or related operations, one or more network designs based on positions (actual and/or theoretical), sight paths, network structure, some combination, and/or other things can be designed, constructed, displayed, and/or overlaid. In some embodiments, one or more elements shown in FIG. 7 may be based on data, analysis, and/or other operations performed on the data. For example, FIG. 7 depicts one example of mesh network that can be set up based on operations performed by a mesh network module 215 (among others) and/or UAV data, including actual and/or relative positions, capturing data at one or more heights, positions, directions, relative positions relating to structures and/or inhibitors (among other things), backhaul connections, geographic area, some combination, and/or other information.

Related to FIG. 7, the mesh network communication signals shown serve only as examples. In the examples shown, mesh network communication signals 720 (large diamond checker), mesh network communication signal 725 (small square checker), mesh network communication signal 730 (small waves), and mesh network communication signal 735 (large waves) merely serve as representations to visualize different line of sight communication signals having various differences and/or similarities. In some embodiments, these signals may include, but are not limited to, narrow beam wireless communications.

In some embodiments, system 700 may include a geographic area. In some embodiments, the area shown may include an example of a geographic area. In other embodiments, the area shown may include an example of multiple geographic areas that may each be exclusive and/or non-exclusive subsets of the area shown. In some embodiments, one or more geographic areas may be non-overlapping and/or partially overlapping. In some embodiments, a geographic area may be identified based on one or more characteristics relating to the geographic area. In some embodiments, a geographic area may be identified irrespective of any characteristic relating to the geographic area.

As merely examples, these characteristics may include, but are not limited to, a relative size of an area (e.g., acreage size, total size), a number of structures, a distance related to two or more points (e.g., between structures, streets, foliage, trees, homes, businesses, potential APs locations, relationship to one or more backhaul connections), a named subset (e.g., a neighborhood, a home development, an office complex), orientation of one or more elements (e.g., structures, streets, elements relating to one or more cardinal directions), comparative and/or relative characteristics of a first geographic area vs. a second geographic area, and/or other information.

In some embodiments, one or more components of a system, including but not limited to a UAV, may receive, generate, and/or otherwise collect information relating to a geographic area. This information may come from only components of a system (e.g., communications system 100), only from components outside a system, from user devices and/or CPEs, some combination, and/or other sources. For example, geographic information (including, but not limited to topographic data) may be received from satellite data, such as satellite image data. As another example, geographic information (including, but not limited to topographic data) may be received from aerial vehicle data, such as plane data. As another example, geographic information (including, but not limited to topographic data) may be received from a UAV, such as a drone. In some embodiments, the geographic area may include one or more areas of current wireless communication activity (of and/or relating to a certain company, other companies, and/or some combination, among other things), one or more theoretical areas of theoretical wireless communication activity, and/or one or more areas of expansion for a particular carrier and/or company where they may have zero or only some customers within the geographic area.

In some embodiments, the present systems and method may be performed based on data only received from one or more UAVs, among other components. In some embodiments the present systems and method may optionally be performed based on data received from one or more UAVs and satellite image data. In some embodiments, the UAV data and/or some other location data may be used in conjunction with satellite images to aid in network design methods. In some embodiments, one or more system components may account for, relate to, analyze, identify, and/or make determinations based on UAV data and/or satellite images, among other things. In some embodiments, satellite image data can be used to provide confirmation and/or to validate UAV data and/or may be used to in predictive representations, to aid in displaying one or more representations and/or versions based at least in part on UAV data, and/or any other operations relating to mesh network design.

In some embodiments, methods may include displaying the one or more sight paths on a representation of the geographic area. In some embodiments, this representation may include and/or relate to UAV-captured data. For example, a two dimensional image captured by a drone may be modified to include one or more sight paths, network structures, network organizations, structure identifications, alternative constructions, proposed communication paths and redundancies, some combination, and/or other information. In some embodiments, this representation may include and/or relate to UAV-captured data relating to data and/or information relating to another source. For example, a satellite image may be modified to include one or more sight paths, network structures, network organizations, structure identifications, alternative constructions, proposed communication paths and redundancies, some combination, and/or other information related to the actual UAV-captured information.

In some embodiments, examples of topographic data may include, but are not limited to, elevations, locations, textures, colors, shades, shapes, patterns, trends, orientations, shadowing, sizes, reflectivity, structure type, data relating to one or more geographic areas, other data types disclosed, some combination, and/or others. In addition, in some embodiments, topography data may include, but is not limited to, changes, differences, comparisons, determinations, and/or identifications relating to relative characteristics of one or more objects within a geographic area, including actual objects present (and/or previously present), and/or projected objects relating to potential system and/or other designs.

In some embodiments, one or more operations may be performed on the geographic area information, the topography data, and/or other related information. For example, one or more system components (e.g., AP, remote server, UAV) may analyze at least one of the geographic area information, the topography data, and/or other information. In some embodiments, the analysis may relate only to the geographic area information. In some embodiments, the analysis may relate only to the topography data. In some embodiments, the analysis may include performing one or more operations relating to mesh network module 215, including, but not limited to, operations relating to analysis module 320.

In some embodiments, one or more components of a system (e.g., communications system 100) may perform one or more identifications. For example, identifications may relate to positioning, direction, characteristics, calculations, and/or other parameters relating to wireless networking and one or more geographic areas.

As another example, the identifications may include identifying one or more sight paths. In some embodiments, these sight paths may include current, projected, calculated, alternative, and/or other lines of sight. In some embodiments, these lines of sight may relate to or be specific to one or more backhaul connections, APs (including radios), CPEs, structures, wireless communication signals, and/or other information. In some embodiments, these lines of sight may be based at least in part on a predetermined amount relative to one or more other characteristics relating one or more backhaul connections, APs (including radios), CPEs, structures, wireless communications signals, other lines of sight, and/or other information.

In some embodiments, one or more characteristics and/or parameters of wireless communication signals (e.g., 720, 725, 730, and 735) may influence one or more identifications, analyses, initiations, adjustment, and/or other operations relating to one or more system components. In some embodiments, geographic area information may influence the wireless communication signals (e.g., 720, 725, 730, and 735) and/or mesh network design, including one or more one or more characteristics and/or parameters of identifications, analyses, initiations, adjustment, and/or other operations relating to one or more system components.

In some embodiments, topography data captured by a UAV may influence the mesh network communication signals (e.g., 720, 725, 730, and 735), including one or more one or more characteristics and/or parameters of identifications, analyses, initiations, adjustment, and/or other operations relating to one or more system components. As an example, an absolute and/or a relative position of one or more elements may influence mesh network design communication signal. The relative position may include a position of a structure, a signal inhibitor, an AP, a relative orientation of an AP, a relative direction of another wireless and/or narrow beam communication signal, some combination, and/or other components and/or elements.

Figure 8:
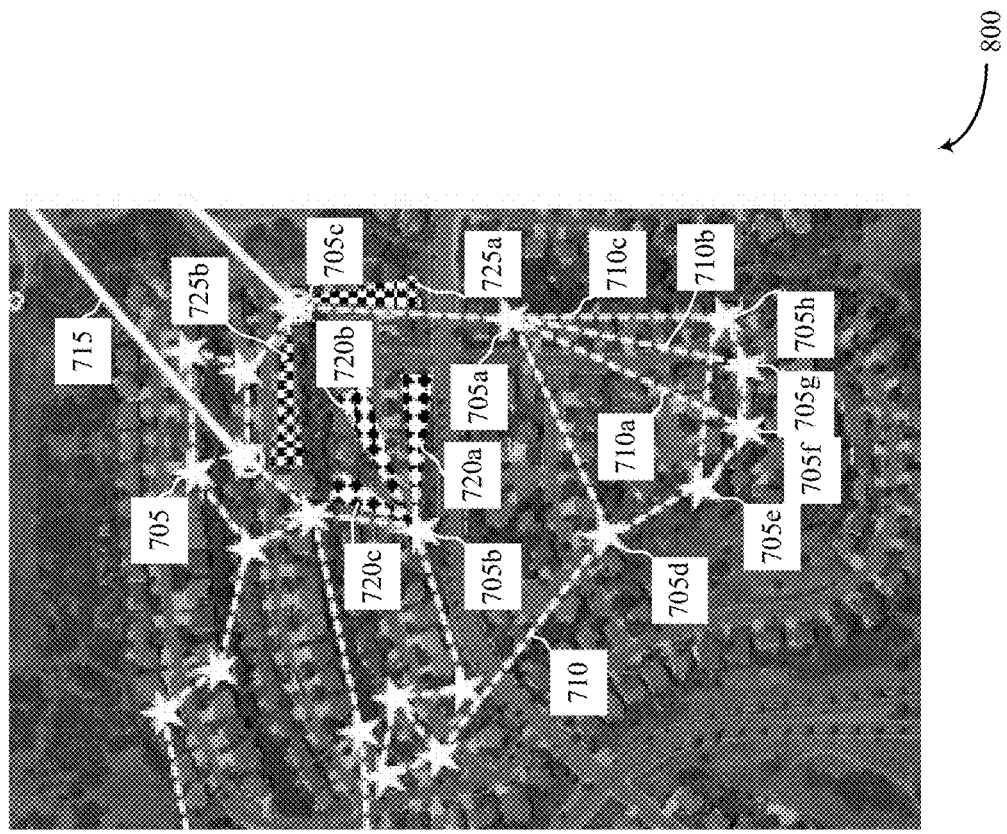
FIG. 8 shows designs illustrating exemplary components and methods relating to wireless networking and communication systems, in accordance with various aspects of this disclosure.
Figure 8:
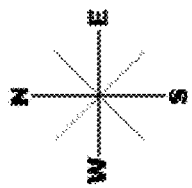

As another example, as shown on FIG. 8 the relative width and/or length of a wireless communication signal (e.g., 720, 725, 730, and 735) may be influenced by the location of one or more signal inhibitors (among other things), which may be determined at least in part based on UAV data. These signal inhibitors may include any component and/or element that inhibits a wireless communication signal (e.g., including narrow beam millimeter wave, non-millimeter wave, and/or others), including but not limited to structures, poles, hills, mountains, foliage (e.g., trees, bushes, brush, vines, etc.), combinations of these, and/or other things.

In some embodiments, the present system and methods facilitate mesh network communication despite the presence and/or relative position of one or more signal inhibitors. For example, by choosing a location of an AP 705, a direction of a wireless and/or narrow beam communication signal (e.g., 720, 725, 730, and 735), a backhaul connection 715, and/or some other component and/or element, the present system and methods may utilize the locations of signal inhibitors to increase performance and reduce interference and other typical network shortcomings. In some embodiments, increased performance and reduced interference (among other things) may be based on and/or related to one or more operations performed by a system (e.g., operations relating to mesh network module 215), including determining one or more lines of sight and/or other network organizational and/or operating characteristics.

In some embodiments, systems and method for wireless network organization and/or operation relating to wireless communication are disclosed. In some embodiments, systems and methods may include performing one or more operations relating to a geographic area (including one or more subsets of a larger area), performing one or more operations relating to topography data, performing one or more operations relating to one or more line of sight paths. The present systems and methods may be utilized for determining, maximizing, and/or minimizing one or more locations, performance parameters and/or characteristics, costs, user coverage, relationship to one or more components, combinations, and/or other information.

In some embodiments, the present system and methods may include identifying, determining, and/or calculating one or more locations of and/or relating to communication lines 710, APs 705, mesh network communication signals (e.g., 720, 725, 730, and 735), backhaul connections 715, combinations, and/or other related components and/or elements. In some embodiments, based at least in part on the location, performance, function, and/or capability (among other things) of one or more system components, one or more operations may be performed, including identifying and/or determining one or more locations, orientations, characteristics, and/or parameters relating to wireless and/or narrow beam communications. In some embodiments, the one or more locations, orientations, characteristics, and/or parameters relating to wireless communications may be related to and/or relative to one or more locations of devices, CPEs, apparatuses, and/or APs, among other things.

In some embodiments, each of these mesh network communication signals may only be millimeter wave communication signals (e.g., 60 GHz). These wireless millimeter wave signals provide advantages by increasing the uplink and downlink speeds over certain distances, reducing the amount of interference that occurs based on the number of APs, reducing the amount of interference that occurs based on the proximity of the APs, reducing the amount of interference that occurs based on the one or more channels of the competing APs, and/or other problems that may occur.

In some embodiments, each of these mesh network communication signals may be millimeter and/or non-millimeter narrow beam wave communication signals (e.g., 5 GHz, 13 GHz, 60 GHz, etc.). Moreover, by designing networks based on the present systems and methods in areas with many signal inhibitors, the signal inhibitors may limit the amount of signal interference, lobe overlap based on narrow beam communication signals, and facilitate increased system, network, and/or component performance.

For example, as shown in FIG. 7, where at least some of the wireless communication signals are more parallel and/or more orthogonal then the presence of signal inhibitors, including but not limited to foliage, by design the network to utilize millimeter wave communications based on the location of the signal inhibitors the system (including individual components and collectively) will exhibit increased performance. In addition, networks designed in accordance with the present systems and methods also permit using larger channel sizes even with a large number of APs based at least in part on the relative positioning of the APs, wireless communication signals, lines of sight, and/or customer-related equipment, among other things.

For example, in some embodiments, due to the lacking channel interference based on the orientation and direction of the narrow beam communication signals, instead of using narrower channel sizes (e.g., 40 megahertz, 30 megahertz, 20 megahertz), the present system and method facilitate using channel sizes of 80 megahertz or more, which provides additional advantages.

In some embodiments, at least some components and/or elements of a system, including but not limited to a remote server 145 and/or mesh network module 215-*a*, may perform one or more operations, such as utilizing a specially-designed algorithm, relating to designing, testing, identifying, determining, and/or adjusting a theoretical and/or an actual network. In some embodiments, one or more system components and/or elements may analyze and/or perform one or more other operations relating to geographic area information and/or topographic data.

In some embodiments, the present system and methods may include one or more modes for discovering, saving, analyzing, and/or adjusting information relating to a geographic area. In some embodiments, this information may include current organization (positioned structures), projected organization (based on plans, analysis, and/or other information), current and/or projected component and element location (e.g., location of APs), current and/or projected narrow beam communication characteristics and/or parameters (e.g., location, orientation, width, length, channel, related devices, etc.), current and/or projected CPE and/or other devices, some combination, and/or other information.

In some embodiments, the present system and methods may include utilizing a femtocell chip (and/or a similar device) within and/or related to one or more system components and/or elements. In some embodiments, one or more APs 705 may incorporate a femtocell chip that may facilitate and/or enables communication using one or more wireless frequency bands (including but not limited to millimeter wave bands, a 60 GHz band, a non-millimeter wave band, a 5 GHz band, a 2.4 GHz band, and/or other frequency bands).

In some embodiments, the one or more APs 705 using a femtocell chip may effectively act as a small cell neighborhood connection. Moreover, in some embodiments, each home or business sufficiently related to the femtocell AP 705 may communicate using this femtocell and/or may itself utilize a femtocell within the home to facilitate various types of communication between devices associated with a home and/or one or more femtocells (in the home, a related home, and/or an AP 705).

In some embodiments, one operation and/or step may include identifying and/or determining one or more lines of sight within one or more geographic areas. This operation and/or step may be based at least in part on geographic area information, topography data, location data, performance characteristics and/or parameters, some combination, and/or other information. In some embodiments, one operation and/or step may include identifying and/or determining, including but not limited to calculating, how to connect one or more lines of sight with each other and/or one or more components and/or elements with the fewest amount of lines of sight, communication paths, APs, backhaul connections, some combination, and/or other information.

In some embodiments, one operation and/or step may include identifying and/or determining, including but not limited to calculating, how a potential and/or an actual network design may perform under certain conditions, including determining how each AP and/or customer-related device (e.g., CPE, user devices, etc.) may perform, individually and/or collectively. In some embodiments one or more of these operations and/or steps may be based on a preferred customer, an existing customer, an existing system, an existing system component and/or element, a relative location of an existing system, system component, and/or system element to another system, system component, and/or system element, imposed constraints based on one or more performance characteristics and/or parameters, some combination, and/or other information.

In some embodiments, the present systems and method may include performing one or more operations, including but not limited to identifying one or more line of sight paths. These lines of sight paths may include lines of sight. In some embodiments, these line of sight paths may be based at least in part on a predetermined amount. In some embodiments, this predetermined amount may include but is not limited to a degree value, an orientation, a direction, a distance, a linear distance, one or more narrow beam communication signal characteristics and/or parameters, a relative degree value, a relative orientation, a relative direction, a relative distance, a relative linear distance, one or more relative narrow beam communication signal characteristics and/or parameters, some combination, and/or other amounts.

In some embodiments, this predetermined amount may include but is not limited to a relative relationship between two or more system components, organizational characteristics, and/or other information. For example, the relative relationship may relate to and/or be between a first line of sight path and a second line of sight path. In some embodiments, these line of sight paths may be independent of, dependent on, and/or related to one or more other system components and/or elements, geographic area information, topography data, UAV data, wireless communication characteristics and/or parameters, some combination, and/or other information.

In some embodiments, a line of sight may be related to one or more locations. These locations may, in some examples, relate to locations within a geographic area, relate to topography data, projected and/or actual system components and/or elements (e.g., APs, narrow beam communication signals), some combination, and/or other information.

FIG. 8 illustrates examples of system 800 in accordance with the present systems, apparatuses, and methods. In some embodiments, one or more components of system 800 may include the same, similar and/or different functions, characteristics, performance, and/or other information relating to other systems, APs, devices, apparatuses, remote servers, and/or modules related to this disclosure, including relating to FIGS. 1-7 and 9-12. In some embodiments, system 800 may include APs 705 and 705a to 705h (depicted as stars), communication lines 710 and 710a to 710c (white dotted lines), backhaul connections 715 (solid white lines), mesh network communication signals (e.g., 720-a, 720-b, 720-c, 725-a, and 725-b), and/or other components. In some embodiments, each of these components including the mesh network communication signals may include one or more of the same, similar, and/or different properties, functions, characteristics, parameters, and/or other information as discussed in this disclosure.

FIG. 8 provides examples relating to a wireless network, such as a mesh network design, based on the present systems and methods. Based at least in part on the UAV data and related operations, one or more network designs based on positions (actual and/or theoretical), sight paths, and network structure. In some embodiments, one or more elements shown in FIG. 8 may be based on data, analysis, and/or other operations performed on the data. For example, FIG. 8 depicts one example of a mesh network design incorporating the positions that have been determined by UAV data, including positions above one or more structures and the sight paths between multiple structures.

For example, FIG. 8 illustrates a mesh network design with potential and/or actual APs 705a through 705h, where the APs have been positioned based at least in part on UAV-related data. Communication lines 710a through 710c illustrate alternative sight paths between AP 705a and its position in relation to other APs and positions (e.g., 705f, 705g, 705h). FIG. 8 also illustrates that, in some embodiments, the present systems and methods may be used to calculate all possible sight paths between a designate position and/or AP 705 location and a desired, a calculated, and/or otherwise determined number of points, including possible alternative paths between points. For example, as a simplified example in this exemplary representation, AP 705a may facilitate mesh network communication with AP 705e by connecting through a first potential path (through AP 705h) and/or through a second potential path (through 705d).

As another example, an exemplary mesh network design based on UAV data (among other things) may include and/or take into account potential, alternative wireless communication transmissions. For example, mesh network communication signals 720a, 720b, and 720c serve as exemplary mesh network communication signals that, in some embodiments, may themselves be based on sight paths determined, identified, and/or otherwise considered based on UAV data and/or other data related to the present systems and methods. In some embodiments, one or more components may consider these representations and based on related information weigh and/or determine one or more mesh network designs.

In some embodiments, the mesh network designs may include using one or more network and/or system elements in various combinations that may account for the number of mesh connections, implementation cost, specialized hardware and/or software, coverage based on whether the network is or is not functioning, some combination, and/or other concerns. For example, a remote server analyzing UAV data regarding actual lines of sight and coordinates based on Lidar (as one example) could consider various factors and/or competing driving influences in mesh network design. These could include the actual and/or relative number of one or more network components, position of all network components, position of a subset of network components, one or more directions of one or more network components, one or more directions of mesh network communications relating to other mesh network communications (e.g., 725b vs. 720c, 725b vs. 720a), or more network components, distances, heights, costs, a number of actual CPEs related to one or more mesh network communications, some combination, and/or other information.

One or more positions of actual and/or potential components may be based on operations performed by a mesh network module 215 (among others) and/or UAV data, including actual and/or relative positions, capturing data at one or more heights, positions, directions, relative positions relating to structures and/or inhibitors (among other things), backhaul connections, geographic area, some combination, and/or other information.

Figure 9:
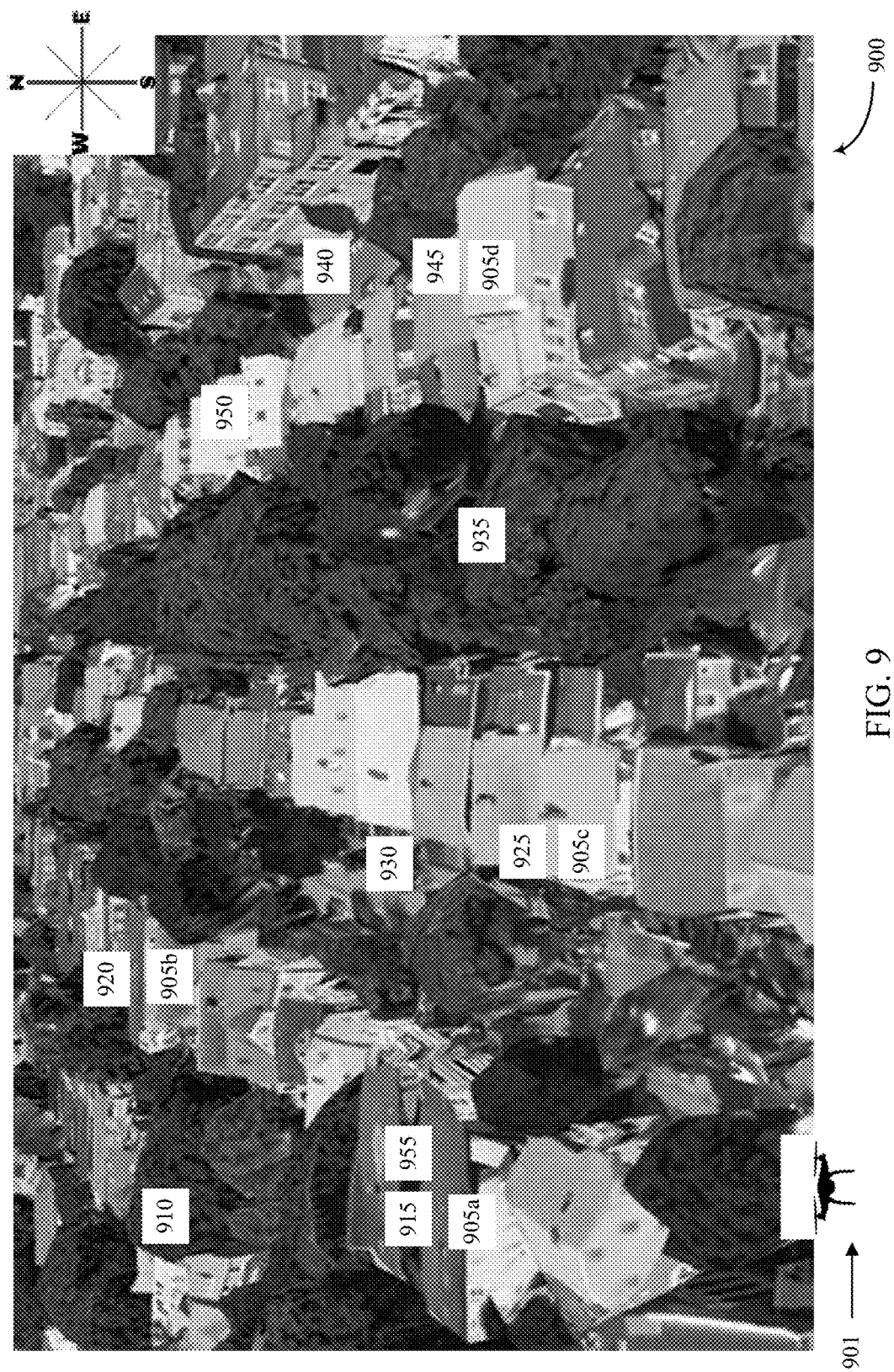
FIG. 9 shows designs illustrating exemplary components and methods relating to wireless networking and communication systems, in accordance with various aspects of this disclosure.

FIG. 9 depicts system 900 in accordance with the present systems, apparatuses, and methods. In some embodiments, one or more components of system 900 may include the same, similar and/or different functions, characteristics, performance, and/or other information relating to other system, APs, devices, apparatuses, remote servers, and/or modules related to this disclosure, including relating to FIGS. 1-8 and 10-12. In some embodiments, system 900 may include any components discussed with respect to other systems and/or in this disclosure. FIG. 9 illustrates at least some examples of UAV 901 obtaining UAV data that relates to the present systems and methods.

In some embodiments, UAV 901 may be programmed to navigate from an initial point to a first predetermined height 910. In some embodiments, this first predetermined height 910 may be directly above an identified point above structure 905a. Example of a first predetermined height 910 may include but are not limited to between 1 and 5 feet, between 5 and 10 feet, between 10 and 15 feet, between 15 and 20 feet, between 20 and 30 feet, between 30 and 40 feet, more than and/or less than any of these, etc. Before, during, or after UAV 901's position at first predetermined height 910, UAV 901 may capture one or more types of data in one or more directions. For example, at first predetermined height 910 UAV 901 may capture data in one or more vertical, sloped, tilted, and/or horizontal directions. After capturing data at first predetermined height 910, UAV 901 may then move to a second predetermined height 915. In some embodiments, this second predetermined height 915 may be directly above an identified point above structure 905a. Example of a second predetermined height 915 may include but are not limited to between 1 and 5 feet, between 5 and 10 feet, between 10 and 15 feet, between 15 and 20 feet, between 20 and 30 feet, between 30 and 40 feet, more than and/or less than any of these, etc.

In some embodiments, second predetermined height 915 may be exactly the same as or different from first predetermined height 910. In some embodiments, second predetermined height 915 may only differ from first predetermined height based on a vertical height. In some embodiments, second predetermined height 915 may differ from first predetermined height based on a vertical height and/or one or more of direction and/or distance, among other things.

In some embodiments, UAV 901 may determine data relating to a first predetermined height 910, a second predetermined height 915, and/or position 930 (which may include a vertical, a horizontal, a three-dimensional, a cardinal direction, and/or other directional coordinate, among other things). In some embodiments, UAV 901 may determine one or more characteristics, parameters, and/or other information relating to sight paths, positions, inhibitors and/or other structures. For example, UAV 901 may capture data and/or perform one or more other operations relating to determining current, future, potential, and/or other sight paths between one or more points, heights, coordinates, positions, etc.

In some embodiments, from at least one of first predetermined height 910 and/or second predetermined height 915, UAV 901 may capture data relating to one or more other positions within a geographic area. For example, UAV 901 may capture data relating to a direction from first predetermined height 910 toward predetermined position 920 that may relate to structure 905b. In some embodiments, UAV 901 after, before, and/or in addition to capturing data from second predetermined height 915 may move to position 920. In some embodiments, position 920 may be aligned with, the same as, and/or different from at least one of first predetermined height 910 and/or second predetermined height 915.

In some embodiments, UAV 901 may move from position 920 to position 925 relating to structure 905c, position 940 relating to structure 905d, position 945 relating to structure 905d, position 950, and/or position 955. In some embodiments, UAV 901 may start from a first predetermined height 910 to capture data, move to a second predetermined height 915 lower than first predetermined height 910, move back up to an altitude of first predetermined height 910, move at the same height to another lateral position at a first predetermined height 910 to capture data, move to a second predetermined height 915 lower than first predetermined height 910 at the same lateral position, move back up to an altitude of first predetermined height 910, and then move at the same height to an additional lateral position at a first predetermined height 910 to capture data.

In some embodiments, at one or more lateral positions, UAV 901 may capture data continuously and/or during one or more intervals as it moves from a first predetermined height 910 to a second predetermined height 915. In some embodiments, one or more comparisons, calculations, identifications, and/or determinations may be made by UAV 901 and/or another system component to determine whether to capture data continuously over a time and/or a distance interval, based on comparing already-captured data, based on one or more previous analyses, determinations, identifications, some combination, and/or other information. For example, UAV 901 may or may not capture additional data in a second direction toward a position if UAV 901 (and/or some other source) has already captured all necessary and/or relevant data of the same three-dimensional coordinates from a previous position (or will capture such data at a future position). This determinative method may increase the speed of the methods in designing a network without substantially diminishing accuracy. In some embodiments, variations and/or modifications of this path and/or method based on the present systems and methods may be performed in addition to and/or instead of the steps described in these embodiments.

In some embodiments, UAV 901 may capture data relating to one or more positions based on height and/or three-dimensional position, to determine data characteristics relating to structures, mesh network designs, current conditions, inhibitor information (relating to one or more inhibitors such as tree 935 including but not limited to position, height, type, and/or future change, etc.), some combination, and/or other information.

Figure 10:
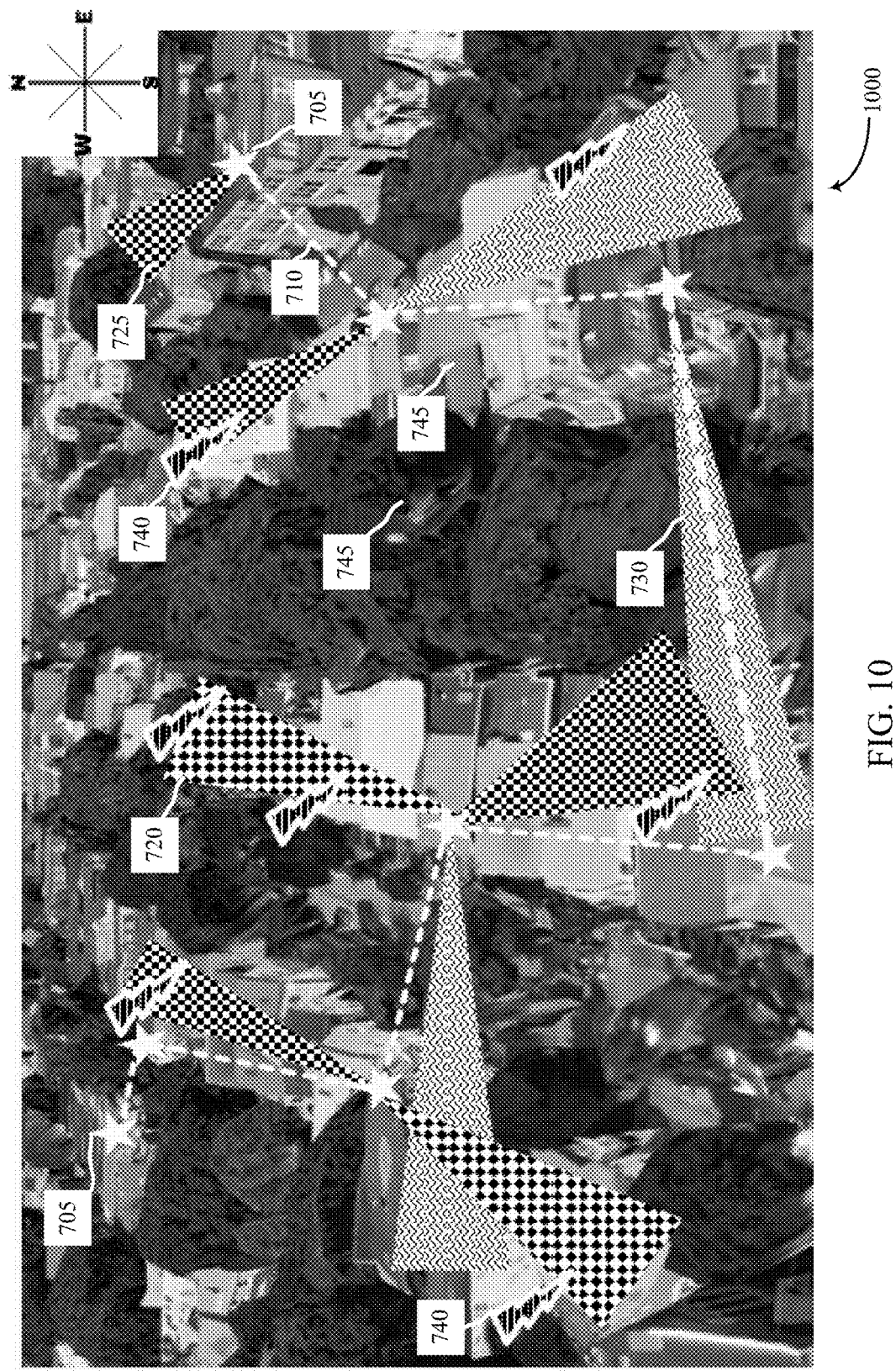
FIG. 10 shows designs illustrating exemplary components and methods relating to wireless networking and communication systems, in accordance with various aspects of this disclosure.

FIG. 10 illustrates examples of system 1000 in accordance with the present systems, apparatuses, and methods. In some embodiments, one or more components of system 1000 may include the same, similar and/or different functions, characteristics, performance, and/or other information relating to other systems, APs, devices, apparatuses, remote servers, and/or modules related to this disclosure, including relating to FIGS. 1-9 and 11-12. In some embodiments, system 1000 may include APs 705 (depicted as stars), communication lines 710 (white dotted lines), mesh network communication signals (e.g., 720, 725, and 730), equipment 740 (e.g., CPEs, user devices such as mobile phone, tablets, etc.), signal inhibitors 745, and/or other components. In some embodiments, the mesh network communication signals may include one or more of the same, similar, and/or different properties, functions, characteristics, parameters, and/or other information.

In some embodiments, system 1000 may include positioning one or more system components relative to one or more structures, signal inhibitors, locations, and/or lines of sight based on the present systems and/or methods. For example, an AP 705 may be positioned (or one or more alternative positions may be determined, identified, calculated, and/or otherwise compared) related to one or more other AP communication lines 710, lines of sight, mesh network communication signals (e.g., 720, 725, and 730), equipment 740 (e.g., CPEs, user devices such as mobile phone, tablets, etc.), signal inhibitors 745, some combination, and/or other elements.

This organization and/or positioning may facilitate one or more APs 705 providing mesh network communication signals (e.g., 720 and 725). This organization and/or positioning may facilitate one or more APs 705 communicating with multiple pieces of equipment 740 and/or other components, including multiple CPEs, multiple apparatuses, multiple user devices, devices, some combination, and/or other devices.

In some embodiments, the present systems and methods provide advantages based at least in part on one or more operations, such as those performed by mesh network module 215-a. In some embodiments, the present system and methods provide advantages based at least in part on the positions and/or locations relating to one or more APs. In some embodiments, the present system and methods provide advantages based at least in part on the one or more lines of sight relating to two or more system components and/or elements.

In some embodiments, the present system and methods facilitate a network of mesh network communication components based at least in part on the location of one or more APs 705. In some embodiments, these APs may be positioned on a roof of a structure in a geographic area, as shown in the exemplary FIG. 10. Certain applications of communication signals, networks, and systems require distinct organization and positioning on environmental factors, including the position and related characteristics of signal inhibitors.

Based at least in part on the operations relating to mesh network module 215-a (among other components), it may be determined that one or more APs 705 should be positioned at a point on a roof of a structure to avoid interference with signal inhibitors and other components. In some embodiments, this rooftop placement allows for less attenuated signals and greater uplink and downlink communication speeds by avoiding inhibitors that may block a line of sight, which impact millimeter and non-millimeter signals to varying degrees. In some embodiments, instead of placing the APs and/or other components in a structure, on a side of a structure, at a street level (on a side of a home, on a pole, or otherwise), the APs and/or other components may be placed on a rooftop to avoid often-present inhibitors such as streets lined with foliage, poles, vegetation, vehicles, and/or buildings, among others.

In some embodiments, placing the APs 705 and/or other components on a rooftop may provide a relatively unchanging, line of sight path from an AP to one or more pieces of equipment 740 and/or other APs 705 to facilitate system performance over time. In some embodiments, this unchanging line of sight path may be based on locations and/or patterns of signal inhibitor positioning, including the location, planting, growth, and/or other characteristics of foliage such as trees and shrubs, structures, and/or other signal inhibitors, as illustrated in FIG. 10, among others. These unchanging lines sight paths may be determined based at least in part on UAV data from specific rooftop and/or other positions, including, in some embodiments, capturing data using one or more UAVs at and/or relating to one or more positions and accounting for potential inhibitors.

In some embodiments, two or more mesh network communications (e.g., 730) may be positioned relative to one another, relative to one or more pieces of equipment 740, signal inhibitors 745, and/or other components and/or elements. For example, a first mesh network communication signal 730 sent from a first AP 705 may be oriented generally south and may have certain characteristics. A second mesh network communication signal 730 sent from a second AP 705 may be oriented generally west and may have some of the same and/or similar characteristics to the first wireless communication signal. Based at least in part on the network design and/or organization from the present systems and methods, channel reuse, and/or interference minimization may employed without adversely affecting system and network performance.

Figure 11:
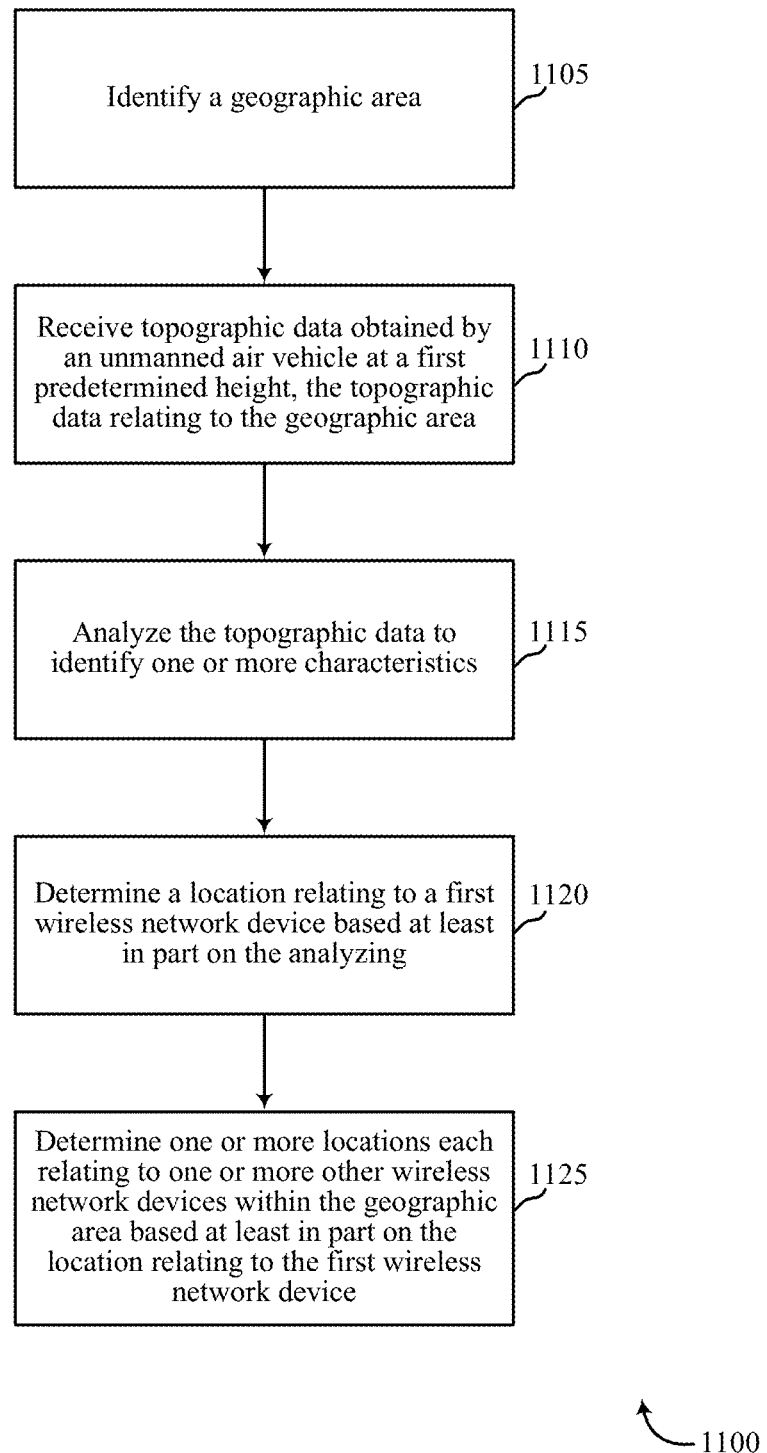
FIG. 11 is a flow chart illustrating exemplary methods relating to wireless networking and communication systems, in accordance with various aspects of this disclosure.

FIG. 11 is a flow chart illustrating an example of a method 1100 for UAV mesh network design and/or implementation, in accordance with various aspects of the present disclosure. For clarity, the method 1100 is described below with reference to aspects of one or more of the UAV 205 described with reference to FIG. 2, and/or aspects of one or more of the UAV 205-a described with reference to FIG. 3, and/or aspects of one or more of the UAV 205-b described with reference to FIG. 4, among others. In some examples, a UAV may execute one or more sets of codes to control the functional elements of the backend server, the UAV, and/or the user device to perform the functions described below. Additionally or alternatively, the backend server and/or the user device may perform one or more of the functions described below using special-purpose hardware.

At block 1105, the method 1100 may include identifying a geographic area. At block 1110, the method 1100 may include receiving topographic data obtained by an unmanned air vehicle at a first predetermined height, where the topographic data may relate to the geographic area. At block 1115, the method 1100 may include analyzing the topographic data to identify one or more characteristics. At block 1120, the method 1100 may include determining a location relating to a first wireless network device based at least in part on the analyzing. At block 1125, the method 1100 may include determining one or more locations each relating to one or more other wireless network devices within the geographic area based at least in part on the location relating to the first wireless network device.

At least some of the operations at blocks 1105-1125 may be performed using mesh network module 215-a (and variations) described with reference to FIGS. 2 and 3, among others.

Thus, the method 1100 may relate to mesh network design using a UAV relating to wireless communication systems. It should be noted that the method 1100 is just one implementation and that the operations of the method 1100 may be rearranged or otherwise modified such that other implementations are possible.

Figure 12:
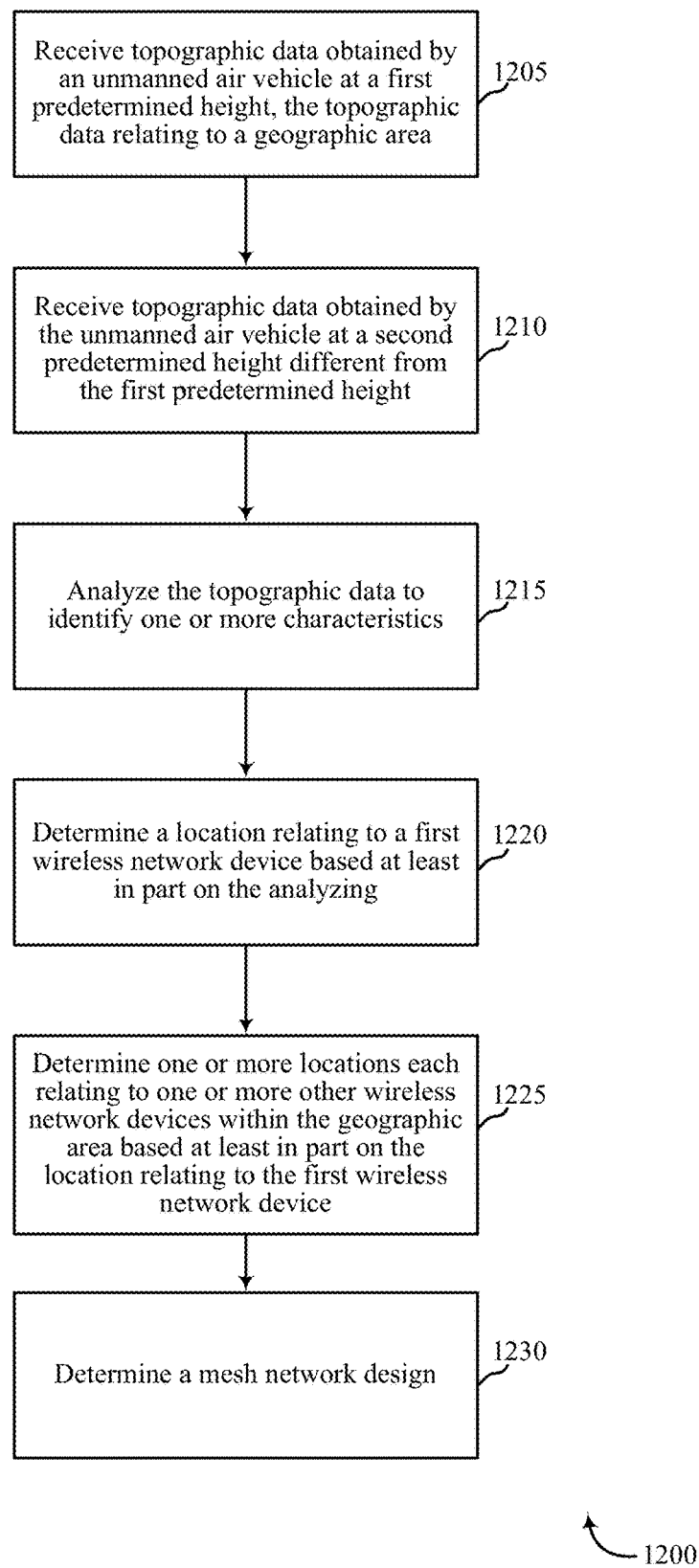
FIG. 12 is a flow chart illustrating exemplary methods relating to wireless networking and communication systems, in accordance with various aspects of this disclosure.

FIG. 12 is a flow chart illustrating an example of a method 1100 for UAV mesh network design and/or implementation, in accordance with various aspects of the present disclosure. For clarity, the method 1200 is described below with reference to aspects of one or more of the UAV 205 described with reference to FIG. 2, and/or aspects of one or more of the UAV 205-a described with reference to FIG. 3, and/or aspects of one or more of the UAV 205-b described with reference to FIG. 4, among others. In some examples, a UAV may execute one or more sets of codes to control the functional elements of the backend server, the UAV, and/or the user device to perform the functions described below. Additionally or alternatively, the backend server and/or the user device may perform one or more of the functions described below using special-purpose hardware.

At block 1205, the method 1200 may include receiving topographic data obtained by an unmanned air vehicle at a first predetermined height, the topographic data relating to a geographic area. At block 1210, the method 1200 may include receiving topographic data obtained by the unmanned air vehicle at a second predetermined height different from the first predetermined height. At block 1215, the method 1200 may include analyzing the topographic data to identify one or more characteristics. At block 1220, the method 1200 may include determining a location relating to a first wireless network device based at least in part on the analyzing. At block 1225, the method 1200 may include determining one or more locations each relating to one or more other wireless network devices within the geographic area based at least in part on the location relating to the first wireless network device. At block 1230, the method 1200 may include determining a mesh network design.

At least some of the operations at blocks 1205-1230 may be performed using mesh network module 215-*a* (and variations) described with reference to FIGS. 2 and 3, among others.

Thus, the method 1200 may relate to mesh network design using a UAV relating to wireless communication systems. It should be noted that the method 1200 is just one implementation and that the operations of the method 1200 may be rearranged or otherwise modified such that other implementations are possible.

In some examples, aspects from two or more of the methods 1100 and 1200 may be combined and/or separated. It should be noted that the methods 1100 and 1200 are just example implementations, and that the operations of the methods 1100 and 1200 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for wireless networking and communications, comprising:
   determining a location of a first wireless network device based at least in part on topographic data obtained by an unmanned air vehicle;
   determining a location of a second wireless network device based at least in part on the topographic data obtained by the unmanned air vehicle;
   identifying a location and one or more characteristics of a signal inhibitor based at least in part on the topographic data obtained by the unmanned air vehicle;
   determining a sight path between the first wireless network device and the second wireless network device based at least in part on the location of the first wireless network device, the location of the second wireless network device, and the location and the one or more characteristics of the signal inhibitor; and
   selecting a link direction for a communication link between the first wireless network device and the second wireless network device based at least in part on the sight path.

2. The method of claim 1, further comprising:
   receiving the topographic data obtained by the unmanned air vehicle at a first predetermined height, wherein determining the location and the one or more characteristics of the signal inhibitor is based at least in part on receiving the topographic data.

3. The method of claim 2, further comprising:
   receiving second topographic data obtained by the unmanned air vehicle at a second predetermined height different from the first predetermined height.

4. The method of claim 1, further comprising:
   receiving image data; and
   analyzing the image data and the topographic data to identify the one or more characteristics of the signal inhibitor.

5. The method of claim 1, wherein the topographic data comprises image data obtained from one or more points within a geographic area.

6. The method of claim 1, wherein the topographic data comprises image data and distance data.

7. The method of claim 6, wherein the distance data comprises one or more distances based at least in part on the location of the first wireless network device and a surface of one or more structures.

8. The method of claim 1, wherein the topographic data comprises image data and direction data.

9. The method of claim 1, wherein the topographic data comprises data describing a spatial relationship between two or more structures.

10. The method of claim 1, wherein determining the location of the first wireless network device comprises:
    comparing a potential location on a surface of one or more structures.

11. The method of claim 1, further comprising:
    comparing the topographic data obtained by the unmanned air vehicle at two or more positions, wherein determining the location of the signal inhibitor is based at least in part on comparing the topographic data obtained by the unmanned air vehicle at the two or more positions.

12. The method of claim 1, further comprising:
    identifying the one or more characteristics of a geographic area based on the topographic data.

13. The method of claim 12, wherein the one or more characteristics of the geographic area comprise:
    a color, a texture, an edge shape, an outline, an object classification, a material, a reflectivity, an orientation, a position, one or more relative heights, one or more relative distances, or a shape, or a combination thereof.

14. The method of claim 1, wherein the unmanned air vehicle comprises a drone.

15. The method of claim 1, wherein the topographic data obtained by the unmanned air vehicle comprises lidar data.

16. An apparatus for wireless networking and communications, comprising:
a processor;
memory in electronic communication with the processor; and
instructions stored in the memory, the instructions being executable by the processor to:
determine a location of a first wireless network device based at least in part on topographic data obtained by an unmanned air vehicle;
determine a location of a second wireless network device based at least in part on the topographic data obtained by the unmanned air vehicle;
identify a location and one or more characteristics of a signal inhibitor based at least in part on the topographic data obtained by the unmanned air vehicle;
determine a sight path between the first wireless network device and the second wireless network device based at least in part on the location of the first wireless network device, the location of the second wireless network device, and the location and the one or more characteristics of the signal inhibitor; and
select a link direction for a communication link between the first wireless network device and the second wireless network device based at least in part on the sight path.

17. A non-transitory computer-readable medium storing computer-executable code, the code executable by a processor to:
determine a location of a first wireless network device based at least in part on topographic data obtained by an unmanned air vehicle;
determine a location of a second wireless network device based at least in part on the topographic data obtained by the unmanned air vehicle;
identify a location and one or more characteristics of a signal inhibitor based at least in part on the topographic data obtained by the unmanned air vehicle;
determine a sight path between the first wireless network device and the second wireless network device based at least in part on the location of the first wireless network device, the location of the second wireless network device, and the location and the one or more characteristics of the signal inhibitor; and
select a link direction for a communication link between the first wireless network device and the second wireless network device based at least in part on the sight path.

18. The apparatus of the claim 16, wherein the instructions are further executable by the processor to cause the apparatus to:
receive the topographic data obtained by the unmanned air vehicle at a first predetermined height; and
receive second topographic data obtained by the unmanned air vehicle at a second predetermined height different from the first predetermined height, wherein determining the location of the signal inhibitor is based at least in part on the topographic data or the second topographic data, or both.

19. The non-transitory computer-readable medium of claim 17, the code further comprising instructions executable by the processor to:
receive the topographic data obtained by the unmanned air vehicle at a first predetermined height; and
receive second topographic data obtained by the unmanned air vehicle at a second predetermined height different from the first predetermined height, wherein determining the location of the signal inhibitor is based at least in part on the topographic data or the second topographic data, or both.

* * * * *